US011005673B2

(12) United States Patent
Tuatini et al.

(10) Patent No.: US 11,005,673 B2
(45) Date of Patent: May 11, 2021

(54) COMMUNICATION GATEWAY SERVICES IN A NETWORKED MESSAGE DISTRIBUTION SYSTEM

(71) Applicant: ORACLE INTERNATIONAL CORPORATION, Redwood Shores, CA (US)

(72) Inventors: Jeffrey Taihana Tuatini, Greenbrae, CA (US); Bradley Harold Sergeant, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/369,537

(22) Filed: Mar. 29, 2019

(65) Prior Publication Data

US 2019/0229939 A1    Jul. 25, 2019

Related U.S. Application Data

(63) Continuation of application No. 14/798,268, filed on Jul. 13, 2015, now Pat. No. 10,277,414.

(Continued)

(51) Int. Cl.
*H04L 12/18* (2006.01)
*H04L 12/58* (2006.01)
*H04L 12/24* (2006.01)

(52) U.S. Cl.
CPC ........ *H04L 12/1859* (2013.01); *H04L 41/026* (2013.01); *H04L 51/36* (2013.01)

(58) Field of Classification Search
CPC .... H04L 12/1859; H04L 41/026; H04L 51/36
See application file for complete search history.

(56) References Cited

U.S. PATENT DOCUMENTS

| 1,092,006 A | 3/1914 | Bailey |
| 3,218,663 A | 11/1965 | Joseph et al. |

(Continued)

FOREIGN PATENT DOCUMENTS

| CN | 102036420 A | 4/2011 |
| CN | 102713909 B | 8/2015 |
| WO | 03036420 A2 | 5/2003 |

OTHER PUBLICATIONS

Advisory Action for U.S. Appl. No. 12/985,269 dated Dec. 13, 2013.

(Continued)

*Primary Examiner* — Gil H. Lee
(74) *Attorney, Agent, or Firm* — Potomac Law Group, PLLC

(57) ABSTRACT

Systems for specialized high-performance electronic messaging campaigns using multiple communication partner channels. Electronic messages are sent to a plurality of differing electronic messaging communication systems using a network communication interface component that is configured to interface with individual ones of the plurality of differing electronic messaging communication systems using individualized script files and individualized parameter files. A network communication interface component is initialized with a first set of configuration instructions using a script input port and a parameter input port. The configured network communication interface component sends an electronic message to a first electronic messaging communication system using the first set of configuration instructions. The network communication interface component is initialized using a second set of configuration instructions, after which electronic messages are sent to a second electronic messaging communication system using the second set of configuration instructions.

17 Claims, 21 Drawing Sheets

Related U.S. Application Data

(60) Provisional application No. 62/026,309, filed on Jul. 18, 2014.

(56) References Cited

U.S. PATENT DOCUMENTS

| | | | |
|---|---|---|---|
| 5,790,858 A | 8/1998 | Vogel | |
| 5,826,239 A | 10/1998 | Du et al. | |
| 5,864,854 A | 1/1999 | Boyle | |
| 6,549,898 B1 | 4/2003 | Inaba et al. | |
| 6,665,677 B1 | 12/2003 | Wotring et al. | |
| 6,714,943 B1 | 3/2004 | Ganesh et al. | |
| 7,132,015 B2 | 11/2006 | Wen et al. | |
| 7,756,256 B1* | 7/2010 | Rukman | H04L 51/36 379/88.13 |
| 7,873,376 B2 | 1/2011 | Coelho | |
| 8,090,612 B2 | 1/2012 | Chao et al. | |
| 8,250,064 B1 | 8/2012 | Ramesh et al. | |
| 8,417,678 B2 | 4/2013 | Bone et al. | |
| 8,510,264 B1 | 8/2013 | Tamm et al. | |
| 8,719,225 B1 | 5/2014 | Rath | |
| 8,732,517 B1 | 5/2014 | Stefani et al. | |
| 8,771,662 B2 | 7/2014 | Zhao et al. | |
| 8,775,448 B2 | 7/2014 | Tuatini et al. | |
| 8,839,256 B2 | 9/2014 | Achilles et al. | |
| 8,869,256 B2 | 10/2014 | Sample et al. | |
| 9,031,586 B1 | 5/2015 | Kilpatrick et al. | |
| 9,037,701 B1* | 5/2015 | Sarihan | H04L 41/12 709/224 |
| 9,247,401 B2 | 1/2016 | Lauder | |
| 9,754,265 B2 | 9/2017 | Seelig | |
| 2002/0042731 A1 | 4/2002 | King et al. | |
| 2002/0087404 A1 | 7/2002 | Silkey et al. | |
| 2002/0091538 A1* | 7/2002 | Schwartz | G06Q 30/02 705/329 |
| 2003/0144898 A1 | 7/2003 | Bibelnieks et al. | |
| 2003/0195862 A1 | 10/2003 | Harrell et al. | |
| 2004/0015504 A1 | 1/2004 | Ahad et al. | |
| 2004/0078538 A1 | 4/2004 | Dutt et al. | |
| 2004/0204973 A1 | 10/2004 | Witting et al. | |
| 2005/0055409 A1* | 3/2005 | Alsarraf | G06Q 10/107 709/206 |
| 2005/0071252 A1 | 3/2005 | Henning et al. | |
| 2005/0192986 A1 | 9/2005 | Butler | |
| 2005/0259575 A1 | 11/2005 | Krishnamurthi et al. | |
| 2006/0053181 A1 | 3/2006 | Anand et al. | |
| 2006/0117318 A1 | 6/2006 | Rumelhart et al. | |
| 2006/0190355 A1 | 8/2006 | Jammes et al. | |
| 2006/0253318 A1 | 11/2006 | Ramsey et al. | |
| 2007/0100783 A1 | 5/2007 | Cialini et al. | |
| 2007/0156842 A1 | 7/2007 | Vermeulen et al. | |
| 2007/0208602 A1 | 9/2007 | Nocera et al. | |
| 2007/0250505 A1 | 10/2007 | Yang et al. | |
| 2007/0294663 A1 | 12/2007 | McGuire et al. | |
| 2008/0005547 A1 | 1/2008 | Papakipos et al. | |
| 2008/0027788 A1 | 1/2008 | Lawrence et al. | |
| 2008/0040191 A1 | 2/2008 | Chakravarty et al. | |
| 2008/0065435 A1 | 3/2008 | Ratzloff | |
| 2008/0262925 A1 | 10/2008 | Kim et al. | |
| 2008/0301256 A1 | 12/2008 | McWilliams et al. | |
| 2008/0320146 A1 | 12/2008 | Norlund et al. | |
| 2009/0063474 A1 | 3/2009 | Curry et al. | |
| 2009/0076908 A1 | 3/2009 | Ingleshwar et al. | |
| 2010/0070448 A1 | 3/2010 | Omoigui et al. | |
| 2010/0250477 A1 | 9/2010 | Yadav | |
| 2010/0274661 A1 | 10/2010 | Aaltonen et al. | |
| 2011/0016123 A1 | 1/2011 | Pandey et al. | |
| 2011/0029375 A1 | 2/2011 | Mason | |
| 2011/0099152 A1 | 4/2011 | Law et al. | |
| 2011/0196742 A1 | 8/2011 | Holal et al. | |
| 2011/0238921 A1 | 9/2011 | Allen et al. | |
| 2011/0282735 A1 | 11/2011 | Kordis et al. | |
| 2012/0130802 A1 | 5/2012 | Shimizu | |
| 2012/0158783 A1 | 6/2012 | Nice et al. | |
| 2012/0173340 A1 | 7/2012 | Zhao | |
| 2012/0191546 A1 | 7/2012 | Phelan et al. | |
| 2012/0192189 A1 | 7/2012 | Diament et al. | |
| 2013/0282837 A1 | 10/2013 | Mayala et al. | |
| 2014/0025763 A1 | 1/2014 | Furlong et al. | |
| 2014/0181039 A1 | 6/2014 | Harrison et al. | |
| 2014/0181579 A1 | 6/2014 | Whitehead et al. | |
| 2014/0372363 A1* | 12/2014 | Chestnut | H04L 51/12 706/52 |
| 2015/0026236 A1* | 1/2015 | Solter | H04L 63/0892 709/203 |
| 2015/0038181 A1 | 2/2015 | Magadevan et al. | |
| 2015/0085863 A1 | 3/2015 | Wu et al. | |
| 2015/0294349 A1 | 10/2015 | Capel et al. | |
| 2015/0332349 A1* | 11/2015 | Els | G06Q 30/0244 705/14.71 |
| 2015/0358259 A1* | 12/2015 | Sterns | H04L 51/36 709/206 |

OTHER PUBLICATIONS

Advisory Action for U.S. Appl. No. 12/985,269 dated Jan. 16, 2014.
Aruhat, "SMS Aggregators: Make sure that your gateways are the best used to give Excellent Services", Mar. 28, 2014, 6 pages.
Cohen et al., "Refreshment policies for Web content caches", Computer Networks, Nov. 8, 2001, 14 pages.
ExactTarget, "SMS Marketing Term of the Day: Aggregator", Jun. 30, 2009, 3 pages.
Final Office Action dated Jul. 22, 2015 for related U.S. Appl. No. 12/985,269.
Final Office Action dated May 26, 2015 for U.S. Appl. No. 13/229,610.
Final Office Action dated Oct. 30, 2014 for U.S. Appl. No. 12/985,269.
Final Office Action for U.S. Appl. No. 12/985,269 dated Sep. 24, 2013.
Final Office Action for U.S. Appl. No. 13/229,610 dated Jan. 31, 2013.
Ford, "IT Research BYTE", LOL: Laugh out Loud or Lots of Love? Integrating SMS into Ford Business Processes, Jun. 25, 2010, 6 pages.
FrancescoChemolli, SquidFaq, InnerWorkings, Squid Web Proxy Wiki, Oct. 27, 2013, 17 pages.
International Search Report and Written Opinion dated Oct. 15, 2015 for related PCT Patent Application No. PCT/US2015/040225, 11 pages.
Mobivate, "psms aggregator", Jan. 14, 2013, 3 pages.
Non-final Office Action dated Apr. 6, 2015 for U.S. Appl. No. 12/985,269.
Non-final Office Action dated Dec. 21, 2015 for related U.S. Appl. No. 14/029,390.
Non-final Office Action dated Jan. 22, 2016 for related U.S. Appl. No. 12/985,269.
Non-Final Office Action dated Jul. 10, 2014 for U.S. Appl. No. 12/985,269.
Non-Final Office Action dated Oct. 17, 2014 for U.S. Appl. No. 13/229,610.
Non-Final Office Action dated Sep. 25, 2015 for related U.S. Appl. No. 13/229,610.
Non-Final Office Action dated Sep. 29, 2016 for related U.S. Appl. No. 14/564,658.
Non-Final Office Action for U.S. Appl. No. 12/985,269 dated Feb. 27, 2013.
Non-Final Office Action for U.S. Appl. No. 13/229,610 dated Jul. 18, 2012.
Non-Final Office Action for U.S. Appl. No. 13/229,610 dated Oct. 4, 2013.
Notice of Allowance and Fee(s) due dated May 27, 2016 for related U.S. Appl. No. 12/985,269.
Notice of Allowance and Fee(s) due dated May 3, 2016 for related U.S. Appl. No. 14/029,390.
Simitsis, "Optimizing Analytic Data Flows for Multiple Execution Engines", May 20-24, 2012.
Tata Communications, "Mobile Messaging Exchange", 2013, 2 pages.

(56) References Cited

OTHER PUBLICATIONS

Twilio, Inc., "TwiML Message: Twilio's Request", Mar. 26, 2013, 2 pages.
Loudon, "How to Set Up an SMS Campaign System", by Guest, Feb. 23, 2010, pp. 1-23.
Malin, "SMS Marketing for Small Businesses: How Your Small Business Can Thrive with Easy, Affordable, Test Message Marketing!", Published by EZ Texting, Apr. 2012, First Edition, pp. 1-46.
Labrinidis et al., "Caching and Materialization for Web Databases", Foundations and Trends in Datalaw, Vo. 2 No. 3, 2009.
Van Der Aalst et al, Inheritance of Interorganizational Workflows to Enable Business-to-Business E-commerce, Electronic Commerce Research, 2: 195-231 (2002) (Year: 2002).
Cohen et al., Refreshment Policies for Web Content Caches, IEEE INFOCOM 2001, pp. 1398-1406, Feb. 2001.

* cited by examiner

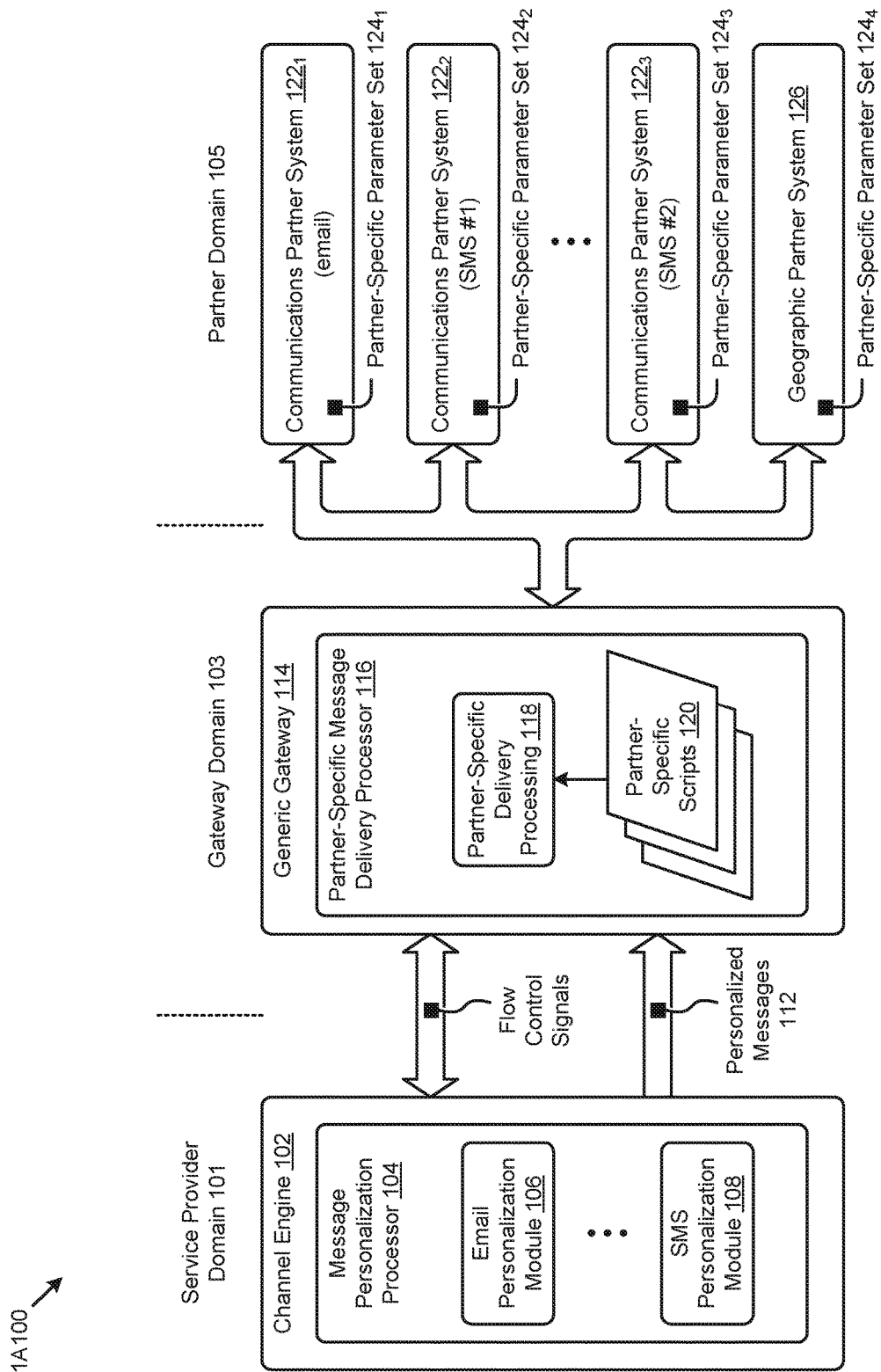
FIG. 1A1

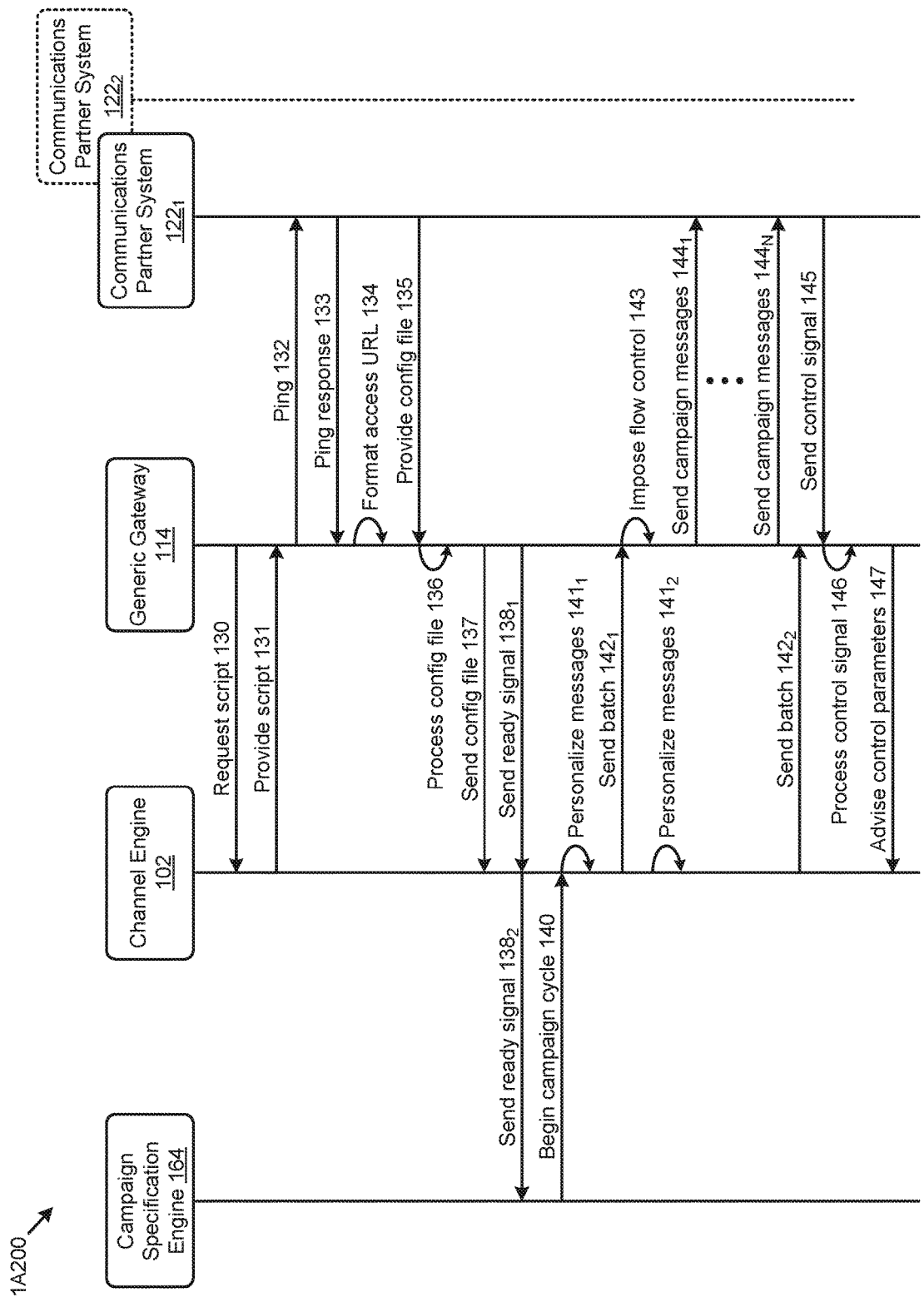
FIG. 1A2

COMMUNICATION GATEWAY SERVICES IN A NETWORKED MESSAGE DISTRIBUTION SYSTEM

RELATED APPLICATIONS

The present application is a Continuation of U.S. application Ser. No. 14/798,268, filed Jul. 13, 2015, which claims the benefit of priority to U.S. Provisional Patent Application Ser. No. 62/026,309, filed Jul. 18, 2014, entitled "SYSTEM, METHOD, AND ARCHITECTURE FOR IMPLEMENTING A CUSTOM CHANNEL ENGINE", filed Jul. 18, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of high-performance electronic messaging, and more particularly to techniques for implementing communication gateway services in a networked messaging system.

BACKGROUND

Broadcasting messages to mass markets (e.g., in an advertising or mass messaging campaign) demands an extremely high degree of technical competence as well as extraordinarily powerful computing systems. Accordingly, private and government entities that engage in broadcasting messages to mass markets rely on third party service providers to administer such mass broadcasting. When such third parties prosecute advertising or messaging campaigns (e.g., an email advertising campaign, an SMS messaging campaign, etc.) it often happens that many communication partners are brought into the ecosystem, for example, so as to extend the reach of the campaign. Such communication partners might be situated on vastly different platforms (e.g., different hardware platforms, different software platforms, different cellular service standards, different geographies, etc.). For example, one partner might be situated in a relatively large geography (e.g., in the Western United States) while another partner is situated in a relatively smaller geography (e.g., on the island of Cebu in the Philippines). Such vastly different ecosystems give rise to vastly different operating conditions. As the popularity and reach of email or other messaging campaigns grows, so does the need to quickly bring on new communication partners— in spite of the fact that their respective ecosystems vary so widely.

Prior attempts to reduce the effort and costs associated with bringing on new communication partners have included use of data files (e.g., initialization or parameter files) that codify some portion of the new partner's ecosystem and method of interfacing with the third party service providers.

SUMMARY

The present disclosure provides systems, methods, and in computer program products for implementing communication gateway services in a networked message distribution system. Certain embodiments are directed to technological solutions to provide age-based policies for determining age-based database cache hits (or misses) and enforcing age-based policies during cache access operations. In particular, practice of the disclosed techniques may, in various embodiments, reduce use of computer memory, reduce demand for computer processing power, and/or reduce communication overhead needed for implementing communication gateway services in a networked message distribution system.

Some embodiments pertain to an improved approach to allow a business process system to interface with external communication partner systems without requiring a custom gateway to be implemented for each external communication partner or each new communication channel. Instead, a generic common gateway is provided to handle deliveries of messages to communication partner systems. This approach is particularly useful in a multi-tenant SaaS platform that is used to deliver highly personalized messages (promotional and transactional) in any of many different channels. The generic gateway permits new channels to be implemented far more quickly since an entirely new channel engine architecture does not need to be custom designed for each new channel.

Embodiments implement techniques for sending electronic messages to a plurality of differing electronic messaging communication systems using a network communication interface component that is configured with a script file and a parameter file. Some embodiments commence by initializing a communication interface component with a first set of configuration instructions using a script input port and a parameter input port. The configured communication interface component sends an electronic message to a first electronic messaging communication system using the first set of configuration instructions. The communication interface component is then initialized using a second set of configuration instructions, after which electronic messages are sent to a second electronic messaging communication system using the second set of configuration instructions.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 is a block diagram of an environment in which a marketing program system uses communication gateway services, according to an embodiment.

FIG. 1A2 is a protocol diagram showing selected uses of communication gateway services in a networked message distribution system, according to an embodiment.

FIG. 2 is a block diagram of a data delivery platform architecture that implements communication gateway services in a networked message distribution system, according to some embodiments.

DETAILED DESCRIPTION

Figure 1B:
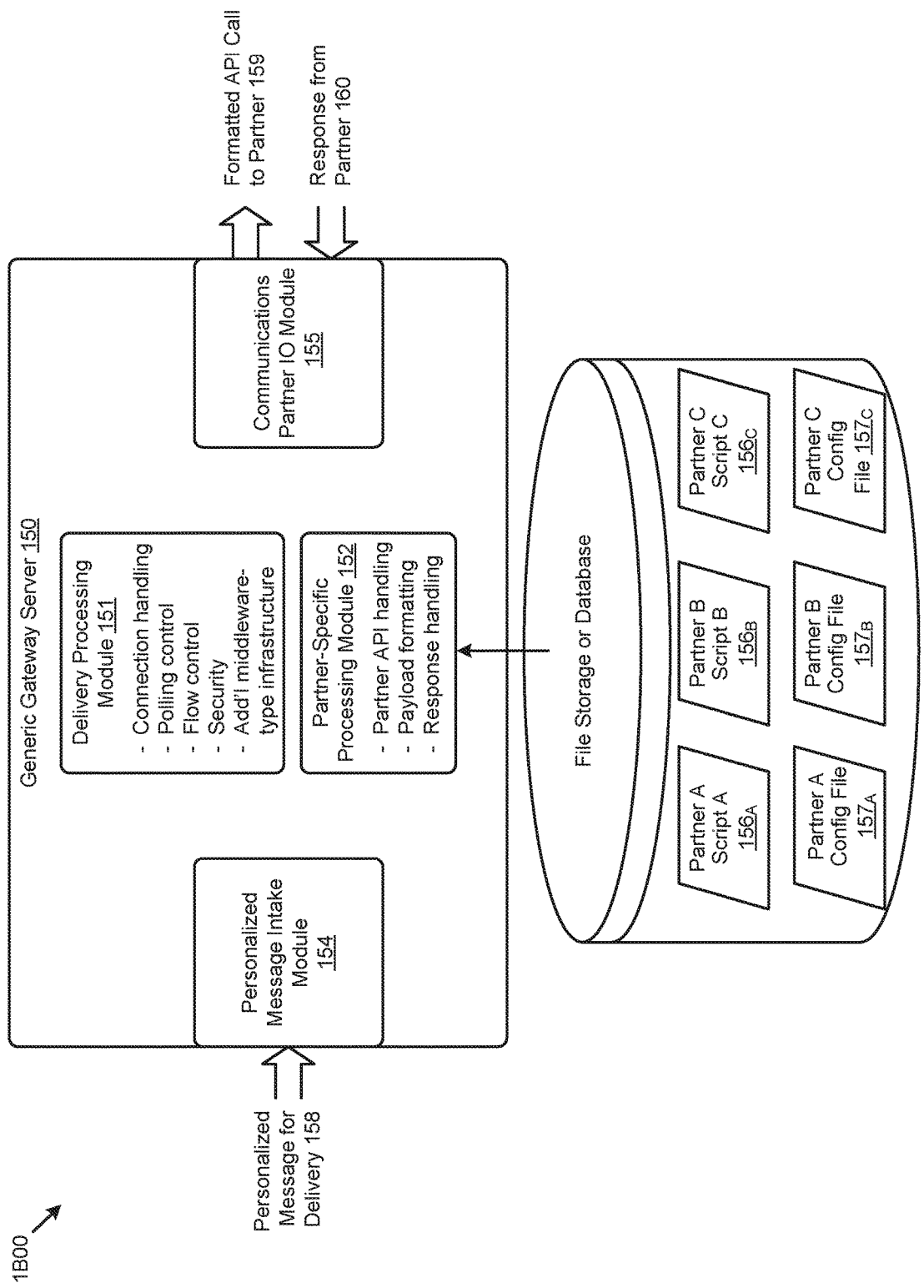
FIG. 1B is a block diagram of a generic gateway, according to an embodiment.

The present disclosure provides systems, methods, and in computer program products for implementing communication gateway services in a networked message distribution system. Certain embodiments are directed to technological solutions to provide age-based policies for determining age-based database cache hits (or misses) and enforcing age-based policies during cache access operations. In particular, practice of the disclosed techniques may, in various embodiments, reduce use of computer memory, reduce demand for computer processing power, and/or reduce communication overhead needed for implementing communication gateway services in a networked message distribution system.

Some embodiments pertain to an improved approach to allow a business process system to interface with external communication partner systems without requiring a custom gateway to be implemented for each external communication partner or each new communication channel. Instead, a generic common gateway is provided to handle deliveries of messages to communication partner systems. This approach is particularly useful in a multi-tenant SaaS platform that is used to deliver highly personalized messages (promotional and transactional) in any of many different channels. The generic gateway permits new channels to be implemented far more quickly since an entirely new channel engine architecture does not need to be custom designed for each new channel.

Embodiments implement techniques for sending electronic messages to a plurality of differing electronic messaging communication systems using a network communication interface component that is configured with a script file and a parameter file. Some embodiments commence by initializing a communication interface component with a first set of configuration instructions using a script input port and a parameter input port. The configured communication interface component sends an electronic message to a first electronic messaging communication system using the first set of configuration instructions. The communication interface component is then initialized using a second set of configuration instructions, after which electronic messages are sent to a second electronic messaging communication system using the second set of configuration instructions.

Automated Campaigns

Marketers are seeking better ways to create, execute, and automate campaigns with the goal of growing revenue and strengthening customer loyalty. A business process management (BPM) engine, or workflow engine, can be used to design and implement business execution actions such as marketing campaigns, compensation calculation models, and supply chain management. In the marketing campaign example, a marketer can use the BPM engine to configure a series of connected workflow execution components that make up a marketing campaign. Some BPM engines allow the marketer to visually design, manage, and automate a multi-stage lifecycle marketing program through a drag-and-drop user interface and a library of pre-built program templates.

One aspect of such business processes/campaigns is personalized messages, which may be a web page, an advertisement, an e-mail communication, a text message, or a mobile message. To generate personalized messages, the marketer designs a template during a design phase for a personalized message that includes stock message sections and personalization sections. The stock message sections contain standardized messages that are the same for all recipients of the personalized message. The personalization sections include commands defined by the marketer that are invoked to personalize the messages using profile information for the intended recipients.

Different approaches can be taken to implement the personalization platforms in the execution environment, where one or more servers performs the business processing for the marketing campaigns. In a software as a service (SaaS) architecture, these servers may be used to service marketing campaigns for multiple customers. In some situations, different types of engines may be provided to handle the different channels/types of marketing campaigns to be executed. For example, for an email campaign, an email channel engine is used, which includes a dispatcher/coordinator entity to manage the email channel execution Similar engines are provided for other channels such as the mobile, social, display, and web channels to provide network communication services to any one or more email channel providers, mobile messaging channel providers, social channel providers, display advertisement channel providers, and web channel content providers.

When external partners participate in the process of delivering the marketing messages, those external partners may have their own customized engines to implement message delivery. One problem is that each custom channel may require its own customized infrastructure (e.g., custom gateway component) to handle delivery of the personalized messages from within the SaaS platform. These customized infrastructures can be both expensive and time consuming to implement, and result in excessive delays and barriers to the ability to service external partners that seek to use their own customized engines.

Some embodiments pertain to an improved approach to allow a business process management (BPM) engine to interface with external communication partner systems without requiring a custom gateway to be implemented for each external communication partner system. Instead, a generic gateway is provided to handle deliveries of messages to communication partner systems, and the generic gateway is configured using a configuration file that pertains to the particulars of the various external communication partner systems.

This approach is particularly useful in a multi-tenant SaaS platform that is used to deliver highly personalized messages (promotional and transactional) in any of many different channels. The techniques disclosed herein permit new channels to be implemented very quickly, since an entirely new channel gateway does not need to be custom designed for the new channel. Indeed, "one-off" or custom external communication partner systems are cost-prohibitive, and parameter-based approaches do not possess enough rich semantics as are needed for integration. This scenario hinders messaging system deployment, and as the prevalence of personalized messaging increases, so does the impact of said hindrances. Still more, in many cases, the sheer number of messages and message throughput requirements pertaining to a personalized messaging or personalized advertising campaign relies, in part, on a high-performance execution environment, often involving multiple high-performance servers and high-performance data retrieval systems in order to satisfy service level objectives.

Execution Environment: Platform Architecture to Satisfy Service Level Objectives Different approaches can be taken to implement the personalization platforms in the execution environment. Such an execution environment may comprise a pipeline of servers that perform the personalization of messages in accordance with the campaign specifications.

In a software as a service (SaaS) architecture, the pipeline of servers may be used to service marketing campaigns for multiple customers. A SaaS architecture facilitates implementation of a platform that can be used to deliver highly personalized messages (e.g., promotional messages, transactional messages, etc.) in or through any digital channel including email channels, mobile channels, web channels, advertisement display channels, social media channels, etc. When the number of personalized messages reaches millions or even billions of personalized messages, a very high—and sustainably high—throughput is desirable, and in some cases is quantified in terms of, for example, throughput and latency. Such terms can be included in a contract or agreement pertaining to service level objectives (SLOs). The herein-described architecture can deliver and sustain expected SLOs. One manner by which a particular SLO is achieved and sustained is by providing different types of engines to handle the different channels/types of marketing campaigns to be executed. For example, for an email campaign, an email channel engine is used, which includes a dispatcher/coordinator entity to manage the email channel execution. A similar engine is provided for each of the other types of channels such as mobile, social, display, and web channels.

A naive approach is to develop a customized engine/gateway to handle delivery of the personalized messages for each and every channel. Such a naive approach has deficiencies to be overcome. To address these deficiencies, various embodiments provide a common gateway that is configurable to handle personalized messages to and from multiple communication channels, rather than providing an individual gateway for each channel engine. Such a common gateway that is configurable to handle personalized messages to and from multiple communication channels implements a range of predefined communication gateway services that are configured using a set of predefined parameters.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 is a block diagram 1A100 of an environment in which a marketing program system uses communication gateway services. As shown, a personalized message service provider domain 101 is separated from a partner domain 105 by a gateway domain 103. Some of the functions performed in each domain are shown and discussed hereunder.

A channel engine 102 performs message processing for personalization (e.g., using a message personalization processor 104). Marketing messages are personalized using profile information to personalize the message (e.g., with the actual name of a targeted recipient). The personalized messages might be intended for distribution using a specific channel format or media (e.g., email, text, push, etc.). In some cases a campaign might send multiple personalized messages to the same recipient over two or more distribution channels (e.g., using an email personalization module 106 and an SMS personalization module 108). To accomplish this, while circumventing the aforementioned problems and deficiencies, a common generic gateway is situated between the personalized message service provider domain and the partner domain.

The output of the channel engine 102 is a set of personalized messages 112 that are sent to the generic gateway 114. The generic gateway in this approach comprises an extensible framework that permits messages to be provided to different channel destinations, for example, through the use of customized scripts using a language such as Javascript. The generic gateway performs partner-specific delivery processing 118 by using the script to format the messages for delivery as may be required by respective communication partner systems (e.g., communication partner system $122_1$, communication partner system $122_2$, communication partner system $122_3$, geographic partner system 126, etc.). Any partner channel can be brought online into this system without requiring a new and specialized gateway to be created. Instead, all that is required is for a new script (e.g., one or more of the shown partner-specific scripts 120) to be created so as to deliver certain communication gateway services that are configured using a set of predefined parameters (e.g., see partner-specific parameter set $124_1$, partner-specific parameter set $124_2$, partner-specific parameter set $124_3$, partner-specific parameter set $124_4$, etc.). Deployment and configuration of such a generic gateway as described permits new channels to be implemented far more quickly, since an entirely new channel engine architecture does not need to be custom-designed for the new channel. Instead, a partner-specific message delivery processor 116 can be implemented based on a partner-specific script and a partner-specific parameter set.

Figure 2:
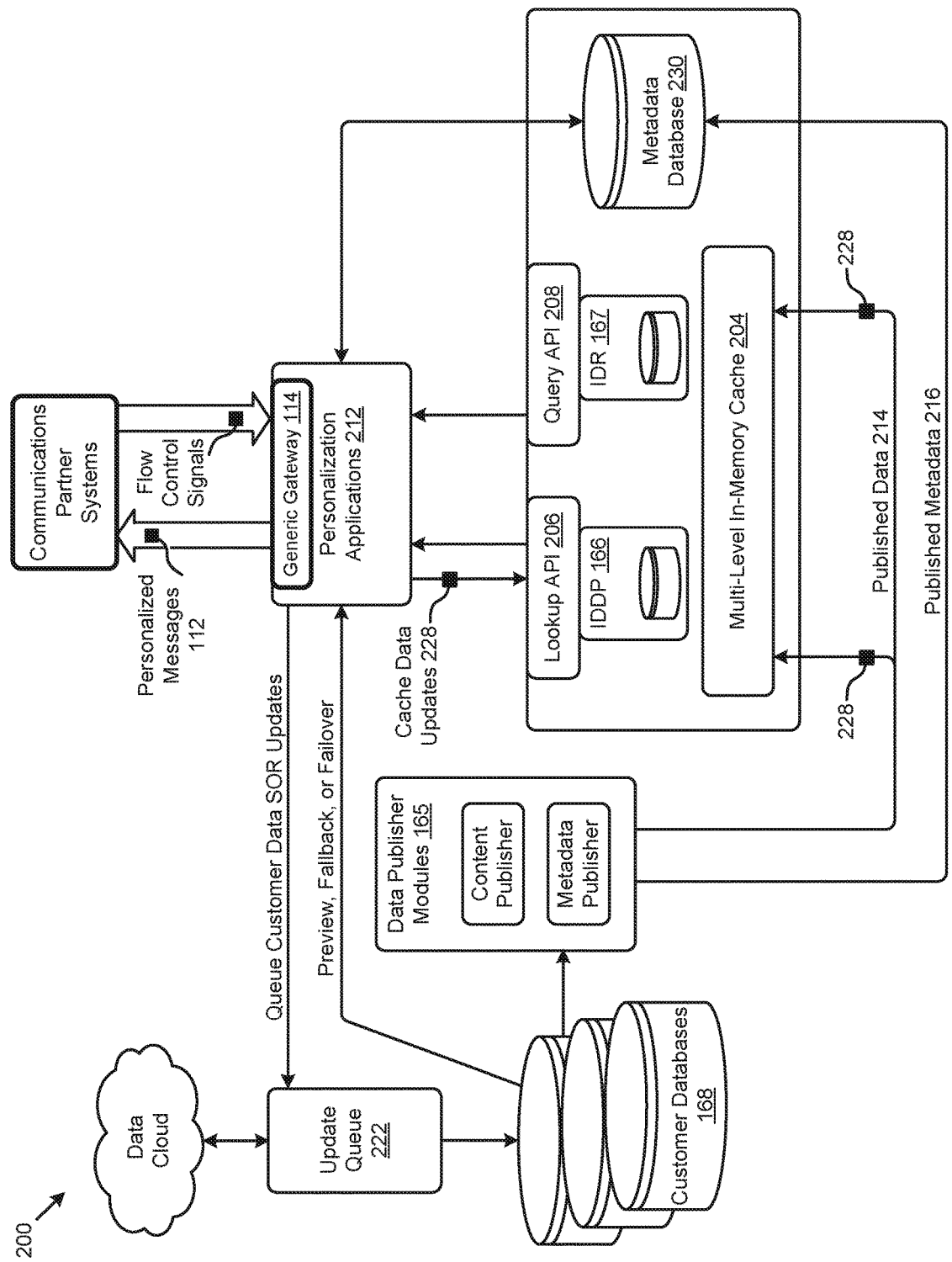

Although the aforementioned partner-specific scripts 120 and partner-specific parameter sets can be used to implement any communication services, an exemplary set of communication gateway services used in an exemplary protocol are shown and described as pertains to FIG. 1A2.

FIG. 1A2 is a protocol diagram 1A200 showing selected uses of communication gateway services in a networked message distribution system. As shown, generic gateway 114 sends a request for a script (see message 130), and a channel engine 102 receives the request for a script and follows the protocol to provide the requested script (see message 131.) The generic gateway is now minimally configured to perform at least a ping of a particular communication partner system (see message 132), and to receive a ping response (see message 133). When the communication partner system is ready, further communication can be carried out. For example, the provided script might contain at least the URL for a resource located at (or accessible by) the communication partner system. Such a URL can be formatted by the generic gateway (see operation 134). A subsequent access using the formatted URL (e.g., formatted and accessed by the generic gateway 114) can be used to retrieve a partner-specific configuration file (see message 135), which is then processed by the generic gateway (see operation 136), possibly involving the script. Strictly as one example, variables (e.g., JavaScript variables) can be initialized to values given in the partner-specific configuration file.

The configuration file can be sent to the channel engine for storage (see message 137), and the channel engine can interpret receipt of the configuration file and/or receipt of a ready message (see message $138_1$) as a 'ready signal'. Instances of such ready signals (see message $138_2$) can be sent onward to one or more campaign specification engines (see email campaign specification engine $164_1$, infra). Any campaign specification engine 164 can receive a ready signal and in turn can signal the channel engine 102 to begin a campaign cycle (see message 140). The channel engine in turn begins to personalize messages (see operation $141_1$) and operation $141_2$) for delivery to the intended recipients through the communication partner's systems, and through the configured generic gateway. A set of personalized messages can be sent in a batch (see message $142_1$), and the configured generic gateway can impose flow control in accordance with the script and configuration parameters provided by the respective communication partner (see operation 143). Strictly as one example, the respective communication partner system might expect to receive no more than 1000 personalized message at a time (e.g., in a batch), and then might expect a 1 second delay after sending the $1000^{th}$ one before sending the $1001^{st}$ message. It is also possible for the channel generic gateway to send campaign messages one-by-one (see message $144_1$, ... message $144_N$). It is also possible to interleave batches with individual messages, and to interleave individual message with batches (see message $142_1$ and see message $142_2$).

In some cases, a communication partner system may experience bandwidth or processing variations, and may want to impose corresponding variations in flow control. Accordingly, a communication partner system can send a control signal 145 to the gateway, and the gateway can, in turn, process the received control signals (see operation 146), possibly including sending updated control parameters to the channel engine (see message 147).

The foregoing description exemplifies a process where the partner supplies script and configuration files for use by the generic gateway 114 when communicating with the partner. Another approach is for the gateway to be configured in the gateway domain by a party other than the communications partner.

The aforementioned generic gateway (e.g., whether in a configured state or in an un-configured state) can be implemented on any computing component, possibly on a server, which may be situated in any geography (e.g., co-located with the channel engine, or co-located with the communication partner system). A server-based implementation is shown and described as pertains to FIG. 1B.

FIG. 1B is a block diagram 1B00 of a network communication interface component embodied as a generic gateway. The generic gateway is implemented using a generic gateway server 150. The shown generic gateway server includes a personalized message intake module 154 to receive personalized messages from the campaign personalization engines (e.g., see path 158). Additionally a communications partner IO module 155 is provided to communicate to/from the partner systems (e.g., see path 159 and path 160). The gateway server includes a delivery processing module 151 to handle non-partner specific aspects of the gateway functionality. This includes, for example, infrastructure to perform connection handling (e.g., to manage connection ports), polling logic and controls, failure and retry mechanisms, flow control messaging (e.g., to control message transmission rates and throughput, to impose buffering if there are incompatible rates, etc.), security processing (e.g., logins), and other infrastructure relating to various types of middleware related processing.

The gateway server also includes infrastructure to manage partner-specific functionality. For example, the gateway server can process specifics pertaining to partner application programming interfaces (APIs) that are used to communicate between the gateway server and any one or more communication partner systems. Some of such gateway API processing includes calculating values used in API calls and/or generating API calls that are specific to a given communication partner system. The different partners may have different API formats and requirements. For example, some partners may use a SOAP API and others may use a RESTful API, with different message formats needed for the different partner APIs. The responsibility of the gateway includes communication with the various communication partners with the correct formats, and processing the different partner messages in accordance with partner-specific scripts and configurations. For example, the gateway receives personalized messages and formats API calls as appropriate to send the personalized messages to the communication partner system for delivery, and then delivers the personalized messages to the partner (e.g., messages are converted into one or more formatted payload portions of one or more communications using the API format).

The gateway server also implements a partner-specific processing module 152 which is configured to handle responses that may be sent back from the partners. Different partners may use different partner-specific response codes.

In some embodiments, script and configuration files are made accessible to the gateway server for the gateway server to be able to interface with the partners in a partner-specific manner. Each communication partner system corresponds to a partner script that is loaded into the gateway (e.g., see partnerA scriptA $156_A$, partnerB scriptB $156_B$, partnerC scriptC $156_C$, etc.). The script is executed by the gateway server to facilitate the gateway server to know how to interface with that partner. The script may be executed in an interpretive mode, where a script interpreter is used to process the script. Alternatively, the script can be converted into a compiled form for more efficient processing and execution. In some embodiments, the gateway uses Javascript as the scripting language for the partner scripts, with the script optionally being converted into compiled Java byte code for more efficient executions.

The configuration function of a script can be extended by using an ".ini file" or a configuration file. (e.g., see config fileA $157_A$, config fileB $157_B$, config fileC $157_C$, etc.). This configurable gateway approach provides numerous advantages since it allows for a very fast and efficient way to integrate new partners and communication partner systems with the personalization system. In addition, this approach advantageously permits the system to programmatically drive processes that are outside the system (e.g., processes under control of or operated by a communication partner's systems), while the messages themselves are personalized within the system. For example, consider a partner having a travel website that handles travel reservations and bookings. Using the above techniques, the message personalization engine can be used to create personalized content that is not limited to just marketing messages. Instead, by loading a partner script for that travel website into the gateway, the system can call the travel website using the travel website's API, and then create personalized content useful for any purpose in that website, e.g., to fill in expected reservations, destination planning, etc.

The embodiment shown in FIG. 1B is merely one example. Additional examples are shown and described herein-below. In particular, a system that can deliver and sustain message delivery while executing a marketing program is shown and discussed as pertains to FIG. 1C.

Figure 1C:
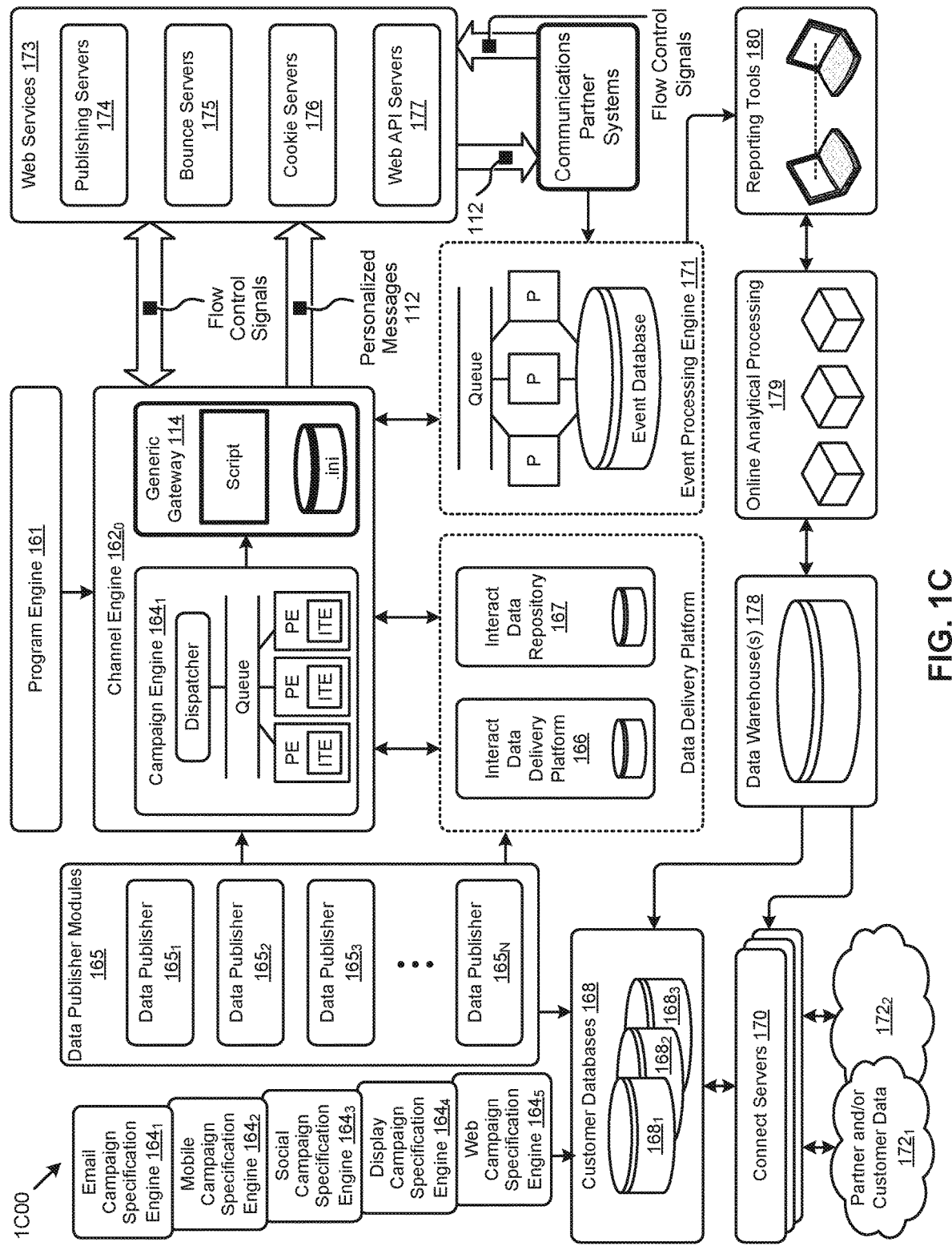
FIG. 1C is a block diagram of a marketing program system that implements communication gateway services in a networked message distribution system, according to an embodiment.

FIG. 1C is a block diagram of a marketing program system 1C00 that implements communication gateway services in a networked message distribution system. As an option, one or more instances of marketing program system 1C00 or any aspect thereof may be implemented in the context of the architecture and functionality of the embodiments described herein. Also, the marketing program system 1C00 or any aspect thereof may be implemented in any desired environment.

FIG. 1C is a schematic diagram of a system architecture in which one or more embodiments of the disclosure may be practiced. A portion of the architecture comprises any number of entities that design or facilitate the design of marketing campaigns to be executed in the SaaS architecture. As shown, one or more campaign engines (e.g., email campaign specification engine $164_1$, mobile campaign specification engine $164_2$, social campaign specification engine $164_3$, display campaign specification engine $164_4$, web campaign engine $164_5$, etc.) are used to design and implement the marketing campaigns. These campaign engines can be implemented, for example, as design applications running on computing systems that are configurable to support the design of campaigns tailored for specific channels and/or specific mediums. Such channels and/or mediums include, for example, email, mobile applications, social media, web outlets, and various types of displays. A marketing person or campaign designer can use the design application to design the content to appear in the email campaign (e.g., text, images, video, etc.), which can then be stored into one or more databases (e.g., customer database $168_1$, customer database $168_2$, customer database $168_3$, etc.). In one embodiment, the design applications are provided to allow the user to visually design, manage, and automate a multi-stage marketing program. In some cases, design applications implement drag-and-drop user interfaces. A library of pre-built program templates can be provided in one or more databases.

In addition to design of content, a campaign designer may design a business workflow for a respective campaign. A business process management engine or workflow engine (e.g., program engine 161) can be used to implement the business execution actions or workflows for the campaign. The program engine comprises any entity or application that describes/designs the various decision points to implement and define the business workflow for the campaign that may be implemented as a multi-stage marketing campaign. The campaign marketer may further provide target lists and/or other data pertaining to the individuals to whom a marketing campaign is targeted. The aforementioned target lists and/or other data may include, for example, lists of customers as well as instructions to identify the subsets of the customer lists that should be the targets of personalized messages during the course of prosecution of the campaign. The customer databases 168 may therefore include relational data pertaining to customers.

Additional components of the marketing program system are configurable to publish campaign data to various components of the system. For example, data publisher modules 165 (e.g., data publisher $165_1$, data publisher $165_2$, data publisher $165_3$, . . . data publisher $165_N$) serve to publish data from the customer database to storage structures that hold the campaign and personalization data for access by the execution environment. A data delivery platform is provided to hold the campaign and personalization data. Such campaign and personalization data can be managed by an interact data delivery platform 166. Also, campaign and personalization data can be stored in one or more data caches, and such data caches can access one or more data repositories such as the shown interact data repository 167.

The marketing program system 1C00 comprises one or more servers that perform business processing pertaining to the marketing campaigns. In this SaaS architecture any of the shown servers may be used to service marketing campaigns for one or more customers. In some embodiments, the execution environment comprises an independent execution environment that is isolated from design and data management. The independent execution environment uses an in-memory cache of the personalization data that is kept in sync with the master data that is located in the design environment. As the cache data is synchronized, the metadata is kept in the execution environment that specifies how recent the cached data is compared to a time stamp or version stamp in a master database such as in the interact data repository 167.

In exemplary embodiments, a generic gateway 114 may be provided to handle personalized messages pertaining to marketing campaigns. For example, one or more instances of channel engine $162_0$ can be employed. A channel engine might include a dispatcher entity to manage the flow of messages when prosecuting a marketing campaign. The channel engine entity (e.g., a process or thread) manages the work placed into a queue for processing by various personalization engines (PEs), possibly in conjunction with web services 173. An interactive template engine (ITE) can be employed by the personalization engine to perform the message personalization. The personalized messages are then sent to a gateway (e.g., the generic gateway 114, as shown) to be processed for transmission to the campaign targets.

In some embodiments, different types of engines may be provided to handle the different channels/types of marketing campaigns to be executed. For example, for an email campaign, one or more email channel engines can be employed. An email channel engine (see FIG. 1D) might include a dispatcher entity to manage the specifics of handling personalized emails. For example, personalized emails can be sent to a generic gateway that has been configured email gateway to be processed for transmission to the campaign targets.

In some embodiments, a gateway is provided to handle personalized messages for multiple ones of the channels rather than providing an individual gateway for each channel engine. In this approach, a common gateway comprises an extensible framework that permits messages to be provided to different channel destinations (e.g., using scripts that use a scripting language such as Javascript). This permits new channels to be implemented far more quickly, since an entirely new channel engine architecture does not need to be custom designed for the new channel.

An event manager mechanism (e.g., event processing engine 171) is employed to manage events in the system. For example, once the messages are sent by a gateway, an "event" is generated that is managed by the event processing engine. After the messages are sent, interactions may occur from various sources. For example, interactions may occur within the online world such as when a receiver of an email message takes some sort of action, which action causes a next event. Such actions and/or events that are caused by the actions can be processed by various web services 173. Such web services can comprise, but are not limited to, publishing servers 174 and/or bounce servers 175 and/or cookie servers 176 and/or web API servers 177. Strictly as an example, when a targeted recipient receives an email from the campaign, that targeted recipient may open the email and then take an action such as (1) reply to the message, (2) navigate to a website, (3) fill out a form, etc., any of which actions then cause a corresponding component from among the web services to generate a new event and to communicate aspects of that event to the event processing engine 171 in the system. As such, the event manager mechanism acts as a "listener" for the new events. A queue is maintained of the events in the system, with an event database to hold data pertaining to the events. One or more processing engines may be used to handle the events in the system.

The events may result in reporting of the event data such as through use of reporting tools 180 and/or through use of online analytical processing 179 (OLAP) systems. In addition, the event data can be stored into one or more data warehouses 178. From the data warehouses, data can be sent back to the customer database (e.g., so as to update the customer data for use in future campaigns). Servers such as the shown connect servers 170 can be used to pass data to and from the customer database(s). In some embodiments, the connect server receives data from partner and/or customer clouds (e.g., cloud $172_1$, cloud $172_2$, etc.) and performs extract, transform and load processing (ETL processing) before sending data to the customer database. Data can also be sent to/from partners' and customers' databases using any known-in-the-art technology.

The program engine 161 executes a business process workflow for any number of work items. Each workflow may have a number of different stages. In one embodiment, a stage is implemented as an abstract class that represents a component within the business process workflow. Examples of stages include an email campaign stage, a short message service (SMS) campaign stage, an elapsed timer campaign stage, a gateway (or "switch") campaign stage, or any other campaign stage. In some embodiments, different business logic may be associated with each of the different types of workflows or stages.

In some embodiments, a stage may include multiple "states" within the stage. Multiple states can be described by a state transition diagram. A group of work items can be input into a given the stage. For example, a stage can include a ready state, a pending state, an executing state, a blocked state, a timer waiting state, and a disposable state. At the ready state, the group of work items is ready for execution of the stage. When a group of work items is initially created and the stage is the first stage of the business process workflow, the group is in a ready state. When an entire group of work items moves from a previous stage to a current stage together, the group is in a ready state. At the pending state, the stage is buffering membership and is not ready for execution. Once the previous stage has completed executing, the state of the group transitions to the ready state. At the executing state, the stage is executing on the group of work items. At the blocked state, the group of work items has failed during execution (e.g., an error has occurred). After the executing state is complete, if additional stages exist in the business process workflow, then the group state transitions to the "ready state" for the next stage of the business process workflow. If no additional stages exist, then the group state transitions to the disposable state. A group of work items becomes disposable when the stage is the last stage of the business process workflow or when there are no subsequent stages. A "garbage collection" process can be scheduled to perform garbage collection at a low load time and can delete the group membership and group for this stage. The timer waiting state is associated with a stage that is an "elapsed time" stage having a future expiration date.

Further details regarding an approach to implement business workflows are described in U.S. application Ser. No. 12/985,269, filed on Jan. 5, 2011, which is hereby incorporated by reference in its entirety.

Figure 1D:
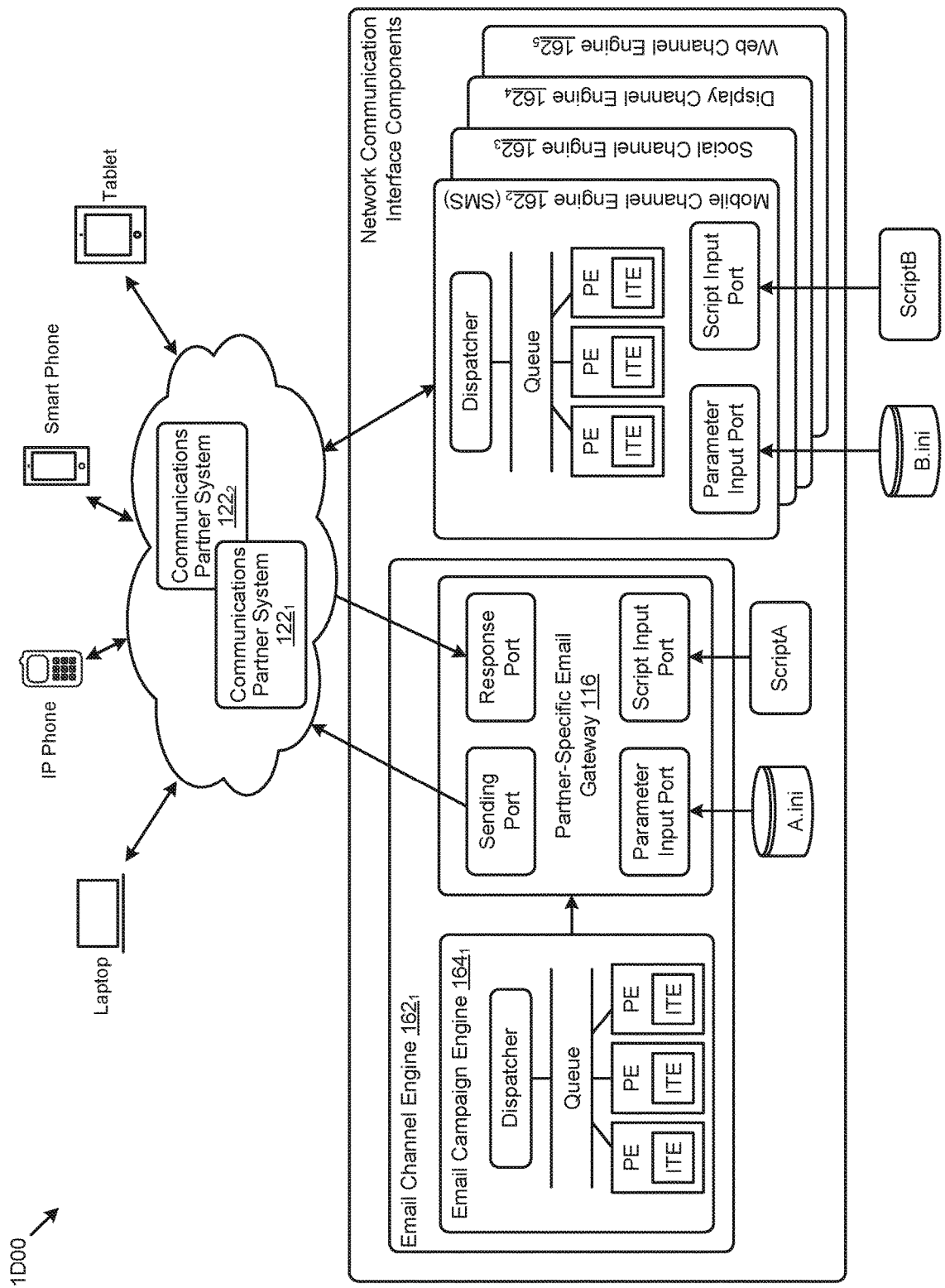
FIG. 1D is a block diagram showing generic gateways that are configured to provide services specific to particular respective channel types, according to an embodiment.

FIG. 1D is a block diagram 1D00 showing network communication interface components embodied as generic gateways that are configured with other components to provide network communication services that are specific to particular respective channel types or instances. More specifically, the diagram shows multiple channel engines (e.g., email channel engine $162_1$, mobile channel engine $162_2$ (SMS), social channel engine $162_3$, display channel engine $162_4$, web channel engine $162_5$, etc.). Each of the channel engines can be partitioned such that each of the channel engines implements respective type-specific and/or campaign-specific engines and such that each of the channel engines implements a configurable instance of a generic gateway 114. As heretofore described, a generic gateway can be configured (e.g., with a script and a configuration file) so as to become a partner-specific message delivery processor (e.g., such as the partner-specific email gateway, as shown).

This embodiment supports various techniques for sending electronic messages to a plurality of differing electronic messaging communication systems using generic gateways that have been configured to provide services specific to particular respective channel types. Initially, each different channel engine has generic gateway that can be is initialized through ports (e.g., a parameter input port and a script input port, as shown). Initialization commences when a first set of configuration parameters (e.g., A.ini) is received at a corresponding parameter input port and processed by the generic gateway. Further, configuration instructions (e.g., scriptA) pertaining to the particular electronic messaging communication system is loaded into the generic gateway via the script input port. As such, the generic gateway has been configured for sending electronic messages to a first electronic messaging communication system (e.g., using the configuration parameters and the configuration instructions). As shown a second and Nth generic gateway can be configured using a similar technique. Specifically, a second or Nth generic gateway is initialized through respective ports (e.g., a respective parameter input port and a respective script input port). The second set of configuration parameters (e.g., B.ini) and a second set of configuration instructions (e.g., ScriptB) are received at the respective second script input port. As such, the second instance of a generic gateway has been configured for sending electronic messages to a second electronic messaging communication system (e.g., using the second set of configuration parameters and the second set of configuration instructions).

The heretofore described scripts can perform initialization functions as well as ongoing message sending/receiving functions. One possible initialization step includes initializing the generic gateway to enable bi-directional communication by configuring a sending port and configuring a response port so as to conform to the communication protocols and/or ports, and/or other mechanisms used by the respective electronic messaging communication system (e.g., a respective communication partner system). Flow control messages can be implemented using bi-directional communication using the sending port and the response port to implement flow controls between the gateway and its corresponding electronic messaging communication system.

The same instance of a generic gateway can be reconfigured as a serially-reusable resource, or multiple instances of a generic gateway can be configured to operate in parallel, such as to communicate email messages at the same time as SMS messages.

Further details regarding general approaches interfacing with a short message service provider are described in U.S. application Ser. No. 14/564,658, titled "COMMON AGGREGATOR FRAMEWORK FOR SMS AGGREGATORS" filed on Dec. 9, 2014, which is hereby incorporated by reference in its entirety.

Figure 1E:
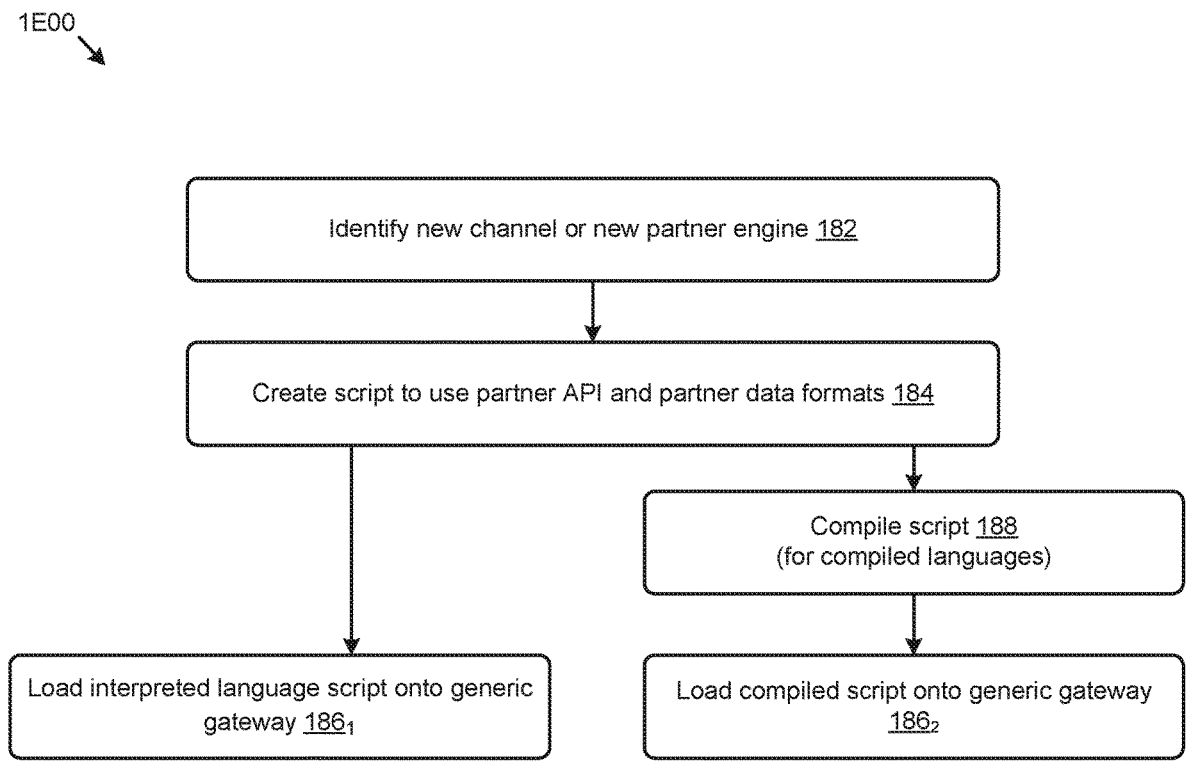
FIG. 1E is a flowchart showing a technique to configure generic gateways so as to provide services specific to a particular respective channel partner, according to an embodiment.

Other steps and sequences for configuring a generic gateway are possible, some of which steps and sequences are shown and described as pertains to FIG. 1E.

FIG. 1E is a flowchart 1E00 showing a technique to configure generic gateways so as to provide services specific to a particular respective channel partner. The flowchart shown exemplifies merely one approach that can be taken to configure the system for a new communication partner system. As shown, the first action (see step 182) is to identify the new communication partner system that needs to interface with the system. Any type of communication partner system can be integrated into the system. For example, the communication partner system may be performing delivery of personalized messages to recipients, e.g., as an ISP or with a customer communication partner system to perform SMS deliveries. Next, a script is created to instruct the gateway of the correct format of the API calls and data formats needed to allow the gateway to interface with the communication partner system (see step 184). In some embodiments, the script is in a Javascript format. In other implementations the script or scripts can use "Groovy", "Ruby", "JRuby", "Python", "JPython", and/or "Scala". The script, whether interpreted or compiled or both is then loaded into the gateway (see step $186_1$ and/or step $186_2$). In some embodiments, scripts can be compiled are compiled before loading into the gateway for more efficient and faster execution. At this point, the generic gateway 114 has been configured to become a partner-specific message delivery processor 116, and it is ready to perform processing steps so as to interface with the communication partner's systems using the partner-specific APIs and parameters.

The aforementioned configuration files can be implemented in many languages, and can cover many parameters. The example configuration parameters and values shown in the table below are thus merely examples for illustration of one embodiment.

TABLE 1 partner.ini configuration file

| Ref | Information |
|-----|-------------|
| 1 | PartnerName=SampleCommsPartner |
| 2 | Url=https://secure-mrr.air2web.com/a2w_preRouter/httpApiRouter? |
| 3 | Username=User1 |
| 4 | PasswordX=EcZtfI6Kr8pmbckPyJS92xA |
| 5 | OutboundConnectTimeoutMilli=30000 |
| 6 | OutboundSocketTimeoutMilli=2000 |
| 7 | HttpConnectionTimeToLiveSeconds=300 |
| 8 | MaxConnectionsForHttpPool=100 |
| 9 | MessageFlowControlEnabled=false |
| 10 | MaxMessagesPerSec=1000 |

In the foregoing partner.ini configuration example, the PartnerName variable specifies the formal name of the partner that this configuration is targeting. The url parameter specifies the uniform resource locator (URL) used to connect to the partner's servers. The specific use of the resource or resources at the URL is determined by a corresponding partner-specific script. In many cases the corresponding partner-specific script is accessed using an HTTPS URL that specifies the partner's web services endpoint. The Username and PasswordX parameters are used for authentication in cases where the partner employs a login paradigm with username and password. The PasswordX setting is encrypted using a locally defined encryption scheme known to the gateway. Additional settings include connection parameters to specify connection timeouts, socket timeouts, how long to continue to use the same connection before recycling it, and the maximum number of concurrent connections for an HTTP connection pool. If flow control is desired the MessageFlowControlEnabled setting may be set to true which allows the MaxMessagesPerSec setting to indicate the maximum number of messages that may be sent per second. Enabling message flow control serves to prevent the remote partner's servers from being overrun with traffic.

Configuration parameters are read by, and used in processing by the scripts. Various forms of the aforementioned scripts can be implemented in many languages and can be interpreted or compiled, or both. The example pseudo code shown in the tables below are thus merely examples for illustration of one embodiment.

TABLE 2

Size calculation script segment

| Ref | Information |
|-----|-------------|
| 1 | // Partner: SampleCommsPartner |
| 2 | // ChannelType: SMS |
| 3 | // Description: This script sends SMS messages using the partner SampleCommsPartner |
| 4 | // First verifies the length of the message and then |
| 5 | // Executes logic related to user specified options |
| 6 | // Truncate, split, or skip messages which are over the limit for cellular encodings. |
| 7 | // The split count is returned via a ReturnField named 'MsgSplitCnt'. |
| 8 | // Messages are then sent to the SampleCommsPartner server using |
| 9 | // HTTP POST. |
| 10 | //Calculate split count and implement mobile limit semantics |
| 11 | function handleMessageSplitCount( ) { |
| 12 |   if (messageSize > maxOneMessageSize) { |
| 13 |     if (mobileLimit.toUpperCase( ) === "TRUNCATE") { |
| 14 |       messageBody = messageBody.substring(0,maxOneMessageSize); |
| 15 |     } |
| 16 |     else if (mobileLimit.toUpperCase( ) === "SPLIT") { |
| 17 |       splitCount = Math.ceil(messageSize/maxMultiMessageSize); |

TABLE 2-continued

Size calculation script segment

| Ref | Information |
|-----|-------------|
| 18 |     } |
| 19 |     else { |
| 20 |       var skipMessage = "Skipped because the limit is exceeded"; |
| 21 |       CUSTOM.results.skipped(skipMessage); |
| 22 |       // The calling logic will see that the message has |
| 23 |       // been marked as skipped so will not be sent. |
| 24 |     } |
| 25 |   } |
| 26 | } |

TABLE 3A

SMS script segment

| Ref | Information |
|-----|-------------|
| 1 | // Send an SMS message via the SampleCommsPartner partner |
| 2 | function sendMessage( ) { |
| 3 |   // If the account is unknown 'settings' will be null. |
| 4 |   // If we know the account then the get the URL, user name, and password from |
| 5 |   // the account settings.ini otherwise get these from the partner.ini file. |
| 6 |   // Assuming the SampleCommsPartner SMS configuration in settings.ini |
| 7 |   // Lookup url, userid, and password from settings.ini. |
| 8 |   if (settings) { |
| 9 |     url = CUSTOM.settings.getStringValue("SmsMtProviders", |
| 10 |       "SampleCommsPartner_mt_param_url"); |
| 11 |     userName = CUSTOM.settings.getStringValue("SmsMtProviders", |
| 12 |       "SampleCommsPartner_mt_param_userid"); |
| 13 |     password = CUSTOM.settings.getDecriptedValue("SmsMtProviders", |
| 14 |       "SampleCommsPartner_mt_param_password"); |
| 15 |   } else { |
| 16 |     url = CUSTOM.partner.getUrl( ); |
| 17 |     userName = CUSTOM.partner.getUsername( ) |
| 18 |     password = CUSTOM.partner.getPassword( ); |
| 19 |   } |

TABLE 3B

Authorization script segment

| Ref | Information |
|-----|-------------|
| 1 | // Set Authorization header |
| 2 | var httpPostMessage = CUSTOM.http.getHttpPostMessage(url); |
| 3 | var encodedUserPassword = CUSTOM.http.encodeBase64(userName + ':' + password, null); |
| 4 | httpPostMessage.setHeader("Authorization", "Basic " + encodedUserPassword); |

TABLE 3C

HTTP POST script segment

| Ref | Information |
|-----|-------------|
| 1 | // Post message |
| 2 | var postResult = CUSTOM.http.post(httpPostMessage, "reply_to", replyTo, |
| 3 |   "recipient", recipient, "body", messageBody, "reporting_key2", |
| 4 |   reporting_key2); |

TABLE 3D

Response parsing script segment

| Ref | Information |
|-----|-------------|
| 1 | // Parse response to get status |
| 2 | var matchCode = /<code>(\d+)<\/code>/.exec(postResult.getContent( )); |
| 3 | var matchReason = /<description>(.+)<\/description>/.exec(postResult.getContent( )); |
| 4 | var responseCode; |
| 5 | var responseMessage; |
| 6 | if (matchCode && matchCode[1]) { |
| 7 |    responseCode = matchCode[1]; |
| 8 | } |
| 9 | if (matchReason && matchReason[1]) { |
| 10 |    responseMessage = matchReason[1]; |
| 11 | } |
| 12 | If (!responseCode) |
| 13 |    responseMessage = "Error::Http Status Code: " + postResult.getHttpStatusCode( ); |

TABLE 3E

Response action script segment

| Ref | Information |
|-----|-------------|
| 1 | if (responseCode === "100") |
| 2 |    CUSTOM.results.sent( ); |
| 3 | else if (responseCode === "901" \|\| responseCode === "992" \|\| responseCode === "998") |
| 4 |    CUSTOM.results.skipped(responseMessage); |
| 5 | else |
| 6 |    CUSTOM.results.failed(responseMessage); |
| 7 | // 994 and 999 response codes |
| 8 | // Return message split count |
| 9 | CUSTOM.results.addReturnField("MsgSplitCnt", splitCount); |
| 10 | } |

Figure 1F:
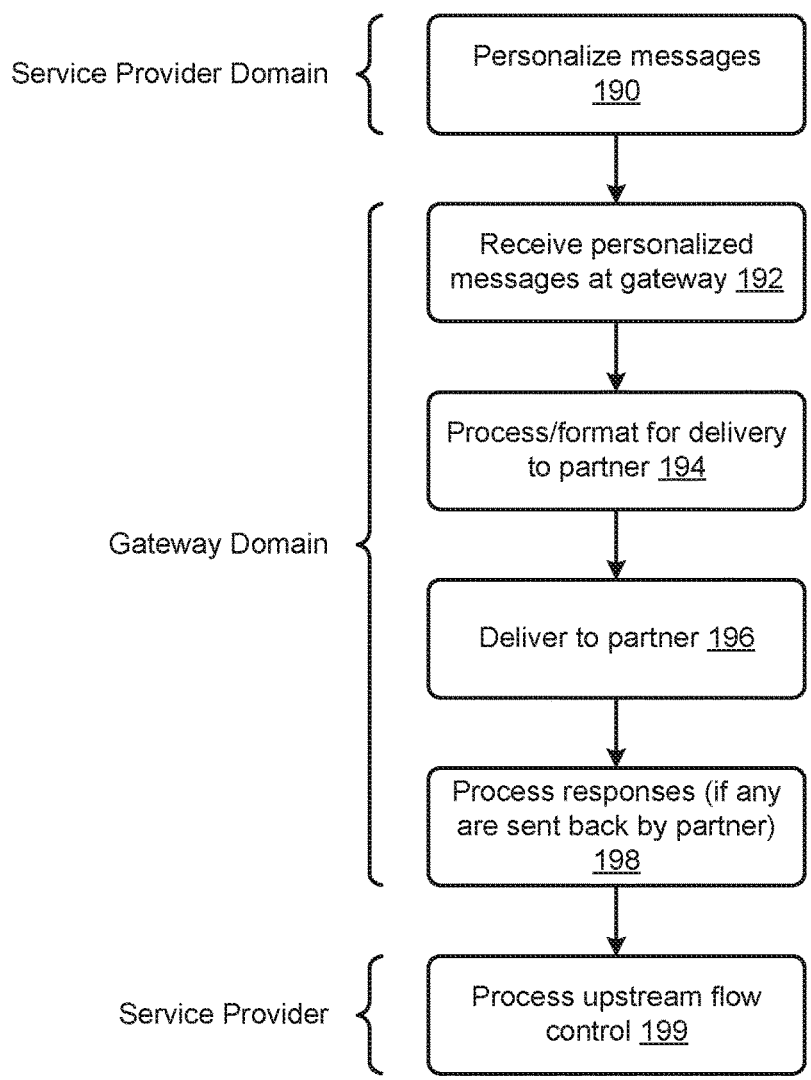
FIG. 1F is a flowchart showing a message delivery technique using partner-wise configured instances of generic gateways that provide services specific to a particular respective channel partner, according to an embodiment.

FIG. 1F is a flowchart 1F00 showing a message delivery technique using partner-wise configured instances of generic gateways that provide services specific to a particular respective channel partner. The flowchart shown exemplifies merely one approach that can be taken to implement some embodiments. The flow commences in the personalized message service provider domain, where a channel engine 102 personalizes the messages (see step 190) in a high-performance execution environment. As noted above, the messages can be personalized using one or more variations of message personalization engines. Next, the personalized messages are received by the gateway for processing (see step 192). The personalized messages are processed/formatted as appropriate for a given partner (see step 194), and then delivered to a partner (see message 196). Delivery to a communication partner may occur, for example by having the gateway create API calls as appropriate to send the personalized messages to the communication partner system for delivery. The data payload is also formatted as necessary for the specified partner. In some embodiments, a script is loaded and used to execute the processing for the communication partner system. The script may be executed in an interpretive mode, where a script interpreter is used to process the script. Alternatively, the script can be converted into a compiled form for more efficient processing and execution.

Next, the properly formatted information is delivered to the communication partner system. The communication partner system will then receive the data from the gateway and take action as appropriate such as to make final delivery of the messages to the targeted recipients. The gateway may also process any responses that are sent back from the partners (see step 198). These responses may take the form of response codes sent from the partner to the gateway. For example any errors or required retries may be indicated by the appropriate response code, and/or flow control information may be passed upstream to be processed by the personalized message service provider (see step 199).

FIG. 2 is a block diagram of a data delivery platform architecture 200 that implements communication gateway services in a networked message distribution system. As an option, one or more instances of data delivery platform architecture 200 or any aspect thereof may be implemented in the context of the architecture and functionality of the embodiments described herein. Also, the data delivery platform architecture 200 or any aspect thereof may be implemented in any desired environment.

Aspects of the data delivery platform architecture 200 are tuned to deliver very high levels of predictability, performance, availability, and scalability. The architecture includes one or more instances of an interact data delivery platform 166 (IDDP), one or more instances of an interact data repository 167 (IDR), a metadata database 230, and a multi-level in-memory cache 204. The IDDP and IDR can be accessed and/or controlled through APIs. As shown, a lookup API 206 provides an interface to/from the IDDP, and a query API 208 provides an interface to the IDR. API calls to/from the IDDP or IDR can carry data objects or pointers to data objects. Strictly as one example, the lookup API 206 can receive objects comprising any number of instances of cache data updates 228. More particularly, operation of personalization applications 212 may receive data from customer databases 168, and may process such data from customer databases using data delivery platform components. During the course of personalization, the personalization applications may store and/or access data that is held in the multi-level in-memory cache 204. Data can also be stored and/or accessed by various data publishers. For example, and as shown, data publisher modules 165 can deliver published data 214 to the multi-level in-memory cache 204, and the data publishers modules can deliver published metadata 216 to the metadata database 230.

The data delivery platform can include any number of cache servers, and such cache servers can be comprised of servers built using commodity-hardware (e.g., Linux servers). The shown multi-level in-memory cache 204 can be a single memory cache, or can be distributed among a group of cache servers. The multi-level in-memory cache 204 can be populated with any partitioning of personalization data including personalization data pertaining to different campaigns. Such an architecture supports scalability to maintain a high number of concurrent lookups at high throughput with a predictable low millisecond response time, even as the number of concurrently in-process campaigns increases. This architecture supports a high volume of data inserts and updates from data publishers, as well as a volume of updates from applications. The approach can be scaled by adding cache servers as the number of concurrently in-process campaigns increases. In some implementations, each cache server has a respective hot standby server to facilitate system-wide high availability. Caches are persisted on local high-speed storage for fast startup after downtime and failure.

The shown metadata database comprises a highly-available transactional database of metadata to support atomicity, consistency, isolation, and durability (ACID). The metadata database stores campaign metadata published from customer databases, and can store live links as may be generated during prosecution of a marketing campaign. In some environments, the metadata dataset is small and can be contained in semiconductor memory for fast access.

As earlier indicated, the data publisher modules 165 publish content data and metadata to the data delivery platform. The data publishers can interface to customer databases and can be implemented as a Java application that publishes campaign personalization data pertaining to campaigns by retrieving data from customer databases and formatting (e.g., formatting into one or more tables) for delivery to the interact data delivery platform 166. In certain embodiments (e.g., such as in high availability installations), tables are published to both multiple cache servers (e.g., a pair of high-availability servers) in parallel. In some cases, publishing a table involves creating a corresponding optimized cache table, initially populating the cache table from the source table, continuously propagating source table changes to the cache table, and un-publishing (e.g., evicting) the cache table when the table is no longer referenced by components involved in any in-progress campaign.

A metadata publisher propagates published campaign metadata to the metadata database and deletes or disables published metadata from the metadata database when a campaign is unpublished. A reverse replication process propagates live links from the metadata database to customer databases. A content publisher propagates published campaign content to the execution content store and purges published content not referenced by published campaigns. The customer databases can be populated from partner and/or customer data (e.g., from cloud $172_1$ and/or from cloud $172_2$). In some cases partner and/or customer data (e.g., from cloud $172_1$ and/or from cloud $172_2$) is queued into an update queue 222 before being populated into the customer databases.

The personalization applications 212 can include a wide variety of applications including launch applications, web channel publishing applications, and user interface (UI) applications. For campaign preview and test links, and for web channel publishing applications, a UI serves to read personalization data and campaign metadata from customer databases. Data updates received by web channel applications are queued to the customer database and eventually get published to the cache through the data publisher. In the interim (e.g., after data updates are received by web channel applications and before they get published to the cache), updates can be populated into multiple caches (e.g., on both the primary and hot standby servers) so that they are immediately available for access. These personalization applications 212 can comprise one or more personalization engine instances.

Figure 3:
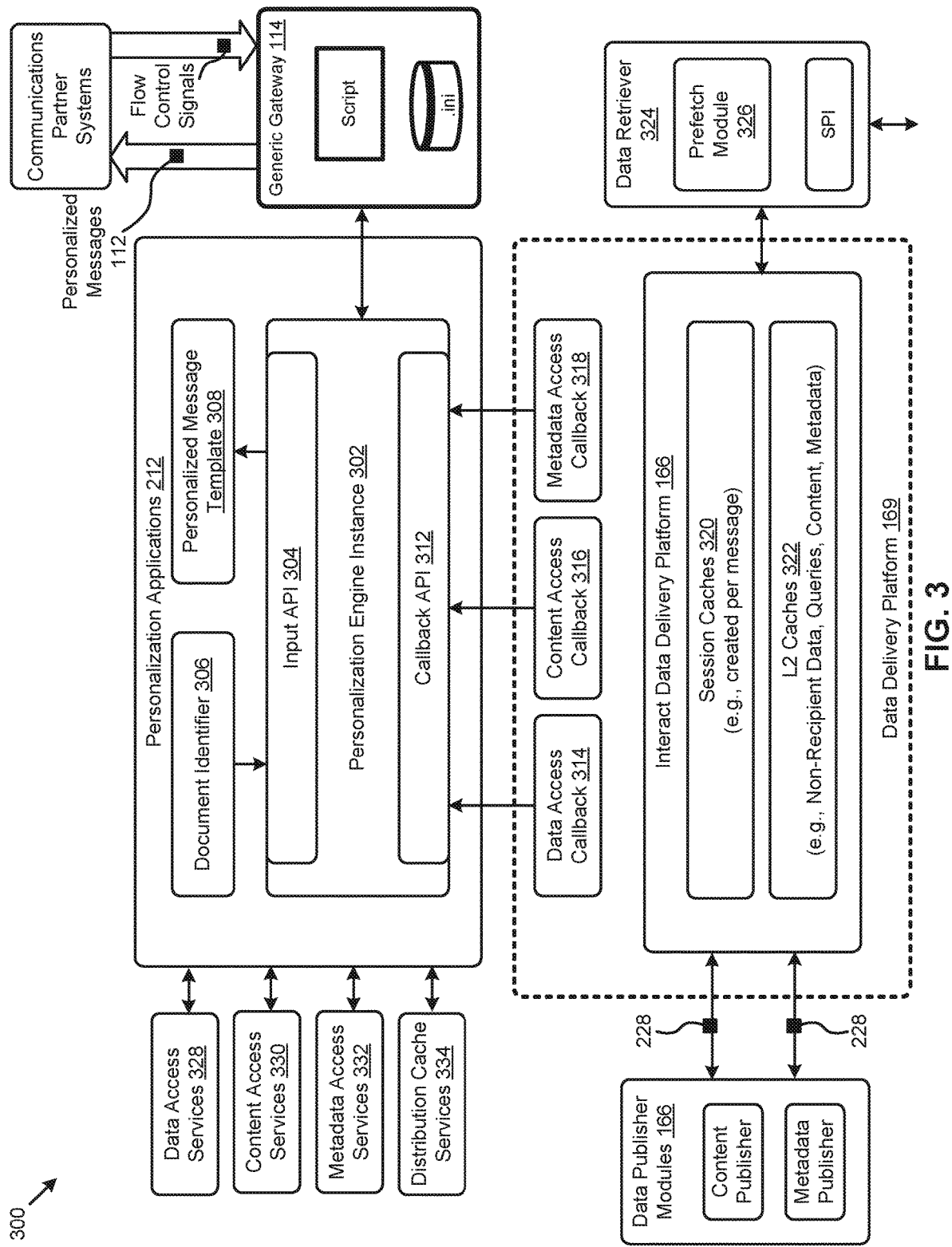
FIG. 3 is a block diagram of a personalization engine comprising personalization applications that implement communication gateway services in a networked message distribution system, according to some embodiments.

FIG. 3 is a block diagram of a personalization engine partitioning 300 comprising personalization applications that implement communication gateway services in a networked message distribution system. The personalization engine partitioning 300 or any aspect thereof may be implemented in any desired environment.

The systems comprising a personalization engine can be partitioned into components embedded within a server application running on a server. In such a partition, the server application creates an instance of the engine (e.g., personalization engine instance 302) and calls the instance to personalize a message. In some cases the instance provides runtime services in the form of access through API s (e.g., input API 304 and callback API 312). Data required for personalization (e.g., a document identifier 306 and a personalized message template 308 within the personalization applications 212) can be pulled in an on-demand basis, possibly through a data access service provider interface (e.g., data access services 328, content access services 330, metadata access services 332, and distribution cache services 334) or through an API. Such a data access service provider or API can be implemented such that data access, content access, metadata access, caching, and/or other environment dependencies can be hidden from the personalization applications.

The personalization engine provides and pulls content, metadata, and other data to/from other components (e.g., as shown). The aforementioned callback APIs work in conjunction with services in the form of a data access callback 314, a content access callback 316, and/or a metadata access callback 318, as shown. The callback services rely on the IDDP to provide multi-level caching, for example, using an in-memory cache that has been populated with personalization data. In some cases, per-message session caches (e.g., see session caches 320) can be created within, or in conjunction with, the in-memory cache. For creating per message session caches, a personalization application 212 defines session caches to hold information specific to the message. Such information can include, but is not limited to, campaign data, runtime parameters, links, form access, triggered launch parameters, retrieved recipient key-value data, and segment group data. Recipient data fetched from key-based lookups and lookup records can also be cached in session caches.

The application maintains second-level LRU caches of campaign and related metadata, non-recipient data, and content (e.g., see L2 caches 322). Non-recipient specific data fetched through key-based lookups and lookup-table built-in queries are cached in L2 caches. For certain lookup-table queries, all fields of looked-up records are fetched and cached instead of single fields to satisfy multiple lookup-table queries of different fields of the same record without incurring multiple network calls.

As earlier indicated (see FIG. 2), campaign data from the customer is located in the customer database. This database includes information about the campaign, information about the recipients, and data about the products. Many tables of relational data may exist in the customer database. The data publishers take the customer data and publishes the data to the multi-level in-memory cache 204 via communication of cache data updates 228. A set of rules is implemented to define the workflows for extracting, transforming, and replicating the data to multiple target destinations.

To implement the campaign, a fast lookup is performed for profile data for the recipients to perform the personalizations by the personalization applications. The in-memory cache includes a key-value store to hold data for the fast lookup. The relational data in the customer database can be converted into a key-value store to enable the fast look-up, for example, as described in U.S. Pat. No. 8,775,448, issued on Jul. 8, 2014, which is hereby incorporated by reference in its entirety. Under certain circumstances, it may also be desirable to perform a search without using the key-value store (e.g., instead using a SQL query against relational data). Therefore, two types of APIs may be exposed, with one to perform key lookups and the other to perform a field lookup. Metadata is maintained in the metadata database to describe the data in the in-memory cache (e.g., to describe the schema of the key-value store).

Updates may occur to the customer data, e.g., where the recipient takes some action, for example though a web form. The updates can be queued (e.g., using the update queue 222) to make the updates to the customer database. The updates can also be made to the in-memory cache.

The data delivery platform is capable of performing in accordance with the following technical considerations:

Campaign execution is isolated from design and data management activities. When execution is isolated from design and data management activities, this allows execution to not be impacted by design-time metadata and content changes and by design and data management workload.

Provision of predictable and sustainable occurrence of low latency random reads. Random read data access with low latency (e.g., predictably less than 5 mS) can be served to personalized web pages predictably (e.g., in less than 100 mS).

Sustained high read throughput. Read data access supports a sustained bulk launch to permit, for example, throughput of 20,000 personalized messages per second.

Continuous availability without downtime. The platform is available without downtime to respond to web requests and real-time messaging requests.

Cost efficient linear scalability by horizontally scaling across commodity hardware and software.

Some embodiments of the disclosure comprise campaigns that are run in a dedicated high performance and high availability execution environment isolated from any impacts from design and data management activities, such as activities to connect jobs and/or to perform filter queries, and is isolated from downtime of the design and data management environment. This means that campaigns rely on execution environment resources. In this approach, there is no dependency or limited dependency on customer databases and/or shared storage area network (SAN) storage.

When execution data is optimized for deterministic fast read access or for predictable fast access, general purpose SQL queries on arbitrary data source schemas are replaced by data access techniques that are optimized for lookups by the campaign (e.g., to accomplish deterministic and predictably fast random read accesses). Identifying the data sources used by a campaign requires parsing and analyzing the campaign metadata and its complete closure of content for database lookup built-ins.

In some embodiments, metadata, content, and data are published into the execution environment. Elements required by an executing campaign are published into the execution environment so that they are accessible on high performance and highly available platforms. Data publishers ensuring that only complete and valid campaigns become executable, that executable campaigns are shielded from design-time changes to metadata and content, and that all campaign dependencies are available in the execution environment. Once a data source is published into the execution environment, the published optimized version is continuously refreshed with updates from the customer database source data-source. Updates flow from the customer database to the execution environment.

In some embodiments, the execution data platform is an in-memory cache on shared cache servers. With compression, the working set of personalization data of accounts of a customer database can be held in memory. Each cache server has a dedicated loaded hot standby that applications can transparently failover to for uninterrupted service. For catastrophic failure of both the primary and standby cache servers, applications failover to the system-of-record customer databases.

The cached data may be durable. Cached data is persisted to local storage so that cache servers can quickly restart and become operational after downtime or failure. Persisted data is only read on startup. Writes to the cache do not need to be fully ACID so long as the persisted data is consistent; missing writes due to a server failure are refreshed from customer databases. A solution of asynchronous consistent background snapshots of the cache to storage would satisfy the durability requirement.

Cached data can be shared by accounts across commodity servers for horizontal scalability. Customer data is naturally separated by account with no sharing between accounts, and is relatively small. This separation is exploited by sharing accounts to different cache servers. The application platform handles account-based routing and failover.

Metadata can be published to an execution metadata database. Metadata from customer databases can be published to a highly available metadata database. Published metadata is read-only for use by campaign execution. Live link metadata generated during campaign execution is also stored in the metadata database and replicated to the customer databases for extract, transform, and load (ETL) processing to the data warehouse. Highly available read access is provided through multiple hot standby servers which allow applications to perform a transparent failover of reads to a standby server without interruption to the services.

Content can be published to an execution content store. Content is published to a highly available execution content store so that it is separated from ad-hoc changes to content during design-time and is always available to executing campaigns. Initially this could simply be a separate tree on the shared file system to provide separation between published and unpublished content. In some cases, it can be a highly available high performance content management system.

Cached data can be accessed using key- or field-based lookups, rather than SQL, in some embodiments. There are two personalization data access use cases: recipient data lookup and built-in lookup. Recipient data lookup is the primary use case; it is typically a key-based lookup by record (RIID) using a technique that returns a single record of key-value pairs of recipient data. Built-in lookup is another use case. Built-in lookup comprises a field-based lookup over one or more fields. Built-in lookups can possibly return multiple records. More details regarding an approach to implement this aspect of the disclosure is described in U.S. Pat. No. 8,775,448, issued on Jul. 8, 2014, which is hereby incorporated by reference in its entirety.

In some embodiments, joins are disallowed, for example, where applications make multiple discrete lookups. Joins are not supported in the data cache. Instead of a joined profile view (JPV) that joins multiple data sources to return a single recipient data record, the application makes multiple discrete lookups, one to each cached data source. Data cache implementations may support pipelining of lookups to reduce the number of round trips and improve throughput and overall latency. The performance viability of multiple discrete lookups is predicated on predictable low-latency lookups that an in-memory data cache and indexed cached data structures are intended to provide.

Data lookups can occur across different cache servers. Multiple lookups allow data to be retrieved from different servers. For example, externally provided content could be cached on a separate server with a separate lookup made to get this content for a get-url-content built-in. Or program transaction data could be looked up from a specialized low-latency on-line transaction processing (OLTP) program data store.

In some embodiments tables are publishable, whereas view data sources such as supplemental SQL views, join views, and filter views are not publishable. Published dynamic-schema tables are transformed into static-schema cache tables. Customers define their table schema in the customer database with columns for each data field. They can dynamically change this schema at any time by adding, modifying, or removing data fields. To avoid locks and impact to lookup latency from dynamically altering cached data structures, published tables are transformed into static-schema cache tables. A cache table has an index column for each field that is used in a lookup, and a single value column containing the values of the remaining non-lookup fields, in compressed CSV format. If the published table has a primary key column, that column can be used as the primary key of the cache table. Once published the cache table schema is deemed to be fixed. This fixed schema supports modification to the schema of non-lookup fields in the source table as their fields are serialized into a single CSV string. If the customer changes the campaign to lookup the data source by new fields, the source table will need to be republished.

The data retriever 324 comprises a prefetch module 326 that fetches data from networked data stores and caches it locally in session or L2 caches depending on whether the data is recipient or non-recipient. The data retriever is called eagerly by the application to prefetch and cache recipient data prior to calling the engine, and is called lazily by the other components upon a cache miss. For bulk launch personalization, the retriever can prefetch for multiple recipients with a bulk lookup or pipelined lookups for high throughput.

Figure 4:
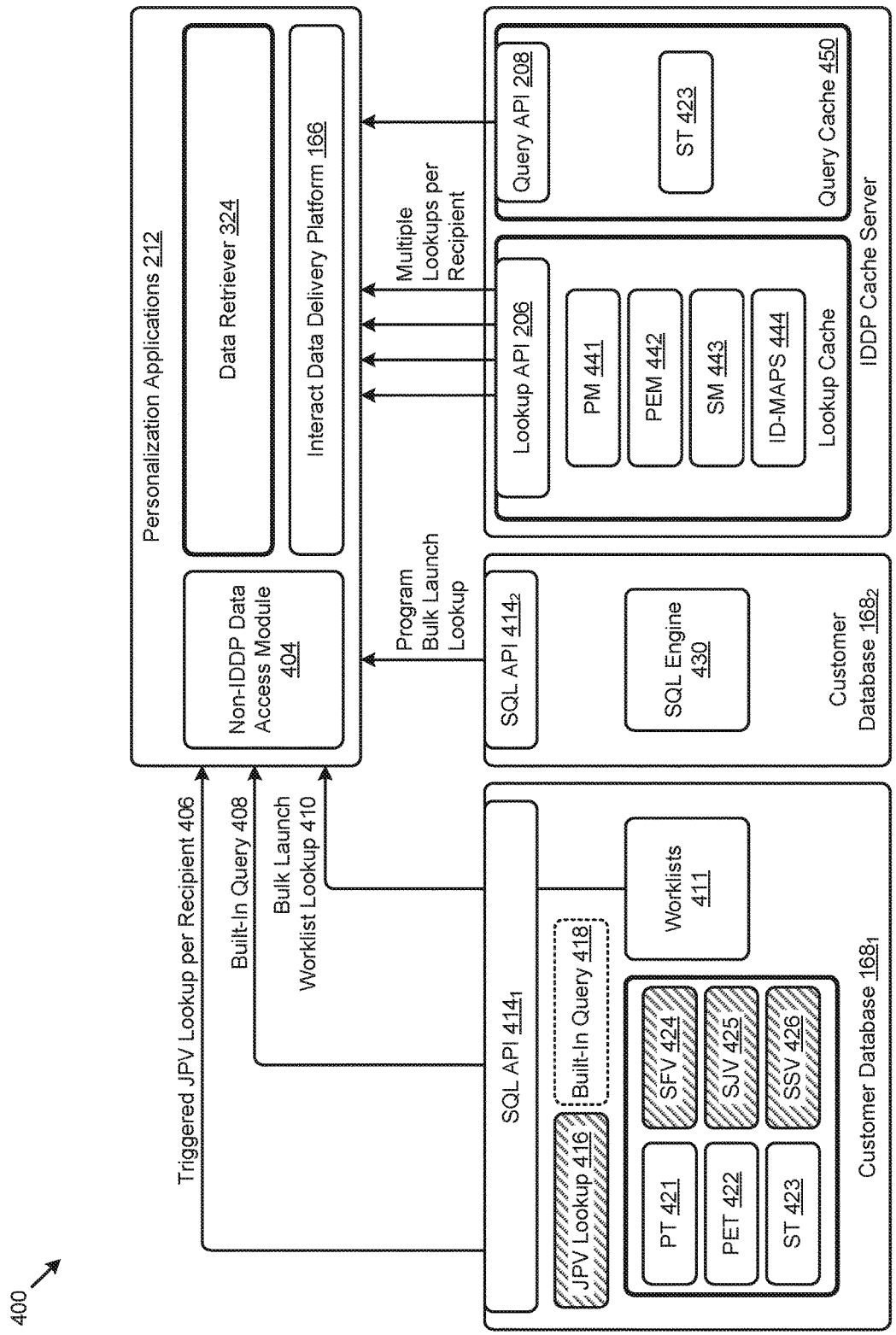
FIG. 4 depicts a data flow between personalization applications and cache servers that implement communication gateway services in a networked message distribution system, according to an embodiment.

FIG. 4 depicts a data flow 400 between personalization applications and cache servers that implement communication gateway services in a networked message distribution system. As an option, one or more instances of data flow 400 or any aspect thereof may be implemented in the context of the architecture and functionality of the embodiments described herein. Also, the data flow 400 or any aspect thereof may be implemented in any desired environment.

A multiple data source data retrieval approach is illustrated in FIG. 4. The data retriever 324 fetches data from different sources depending on whether the campaign is mapped onto the interact data delivery platform or not. Such a mapping determination can be made based on (1) if data has been published to the IDDP cache, and (2) whether or not a failover condition exists. When a campaign is not mapped onto the interact data delivery platform, a non-IDDP data access module 404 can be used. The non-IDDP data access module can receive data from triggered JPV lookups (see path 406, and see JPV lookup 416), and/or from queries to/from the customer database (see path 408 and see built-in query 418), and/or via a bulk launch worklist lookup (see path 410 and see worklists 411).

In this and other embodiments, and as pertains to data retrieval abstraction, the personalization applications are not concerned with details of the data source and the various routing, transformation, protocol, and failure handling logic. The data retriever provides a high-level API made accessible to the application, and the data retriever encapsulates storage access implementation details. Specifically, for backwards compatibility, failover, and lazy publishing, the data retriever encapsulates details including the status of whether it is accessing the IDDP cache servers or is accessing customer databases (e.g., through a non-IDDP data access module 404).

With regard to IDDP vs. non-IDDP campaigns, an IDDP campaign is any campaign created in an account that is enabled for IDDP and whose personalization data sources are not prohibited from being published to an IDDP. All other campaigns are non-IDDP campaigns. With regards to the IDDP cache as compared to the customer database (e.g., the shown customer database $168_2$), non-IDDP campaigns use the customer database (e.g., through SQL API $414_2$ and using SQL engine 430) as the source of personalization data, whereas IDDP campaigns, with certain exceptions, use the cache server as the source of data. Access situations that can result in IDDP campaigns accessing the customer database rather than the IDDP are (a) access for preview, (b) access for retrieving unpublished data, and/or (c) access to customer transaction data.

Lookup cache maps comprise tables declared as personalization data sources of an IDDP campaign include: the profile table (PT 421), 0 or more profile extension tables (PET 422), and 0 or more supplemental tables (ST 423). For published campaigns, each table has a corresponding key-value map in the lookup cache: a profile map (PM 441), a profile extension map (PEM 442), and a supplemental map (SM 443). There are also multiple ID maps 444 in the lookup cache for mapping an email address, a mobile number, and a customer id to RIID. The query cache tables also comprise supplemental tables (ST 423) used as built-in data sources. They can be formed through a join or filter view of a published IDDP campaign and are replicated as needed to the query cache 450. These tables are indexed on the columns used as built-in query predicate fields, and indexed on join columns used by supplemental join views used by built-ins. For multiple lookups per recipient for IDDP campaigns with multiple declared recipient data sources, there are multiple lookups of the lookup cache to retrieve the data for a single recipient, one per map for each declared data source. This is as opposed to a single lookup of the JPV view in the customer database. In addition to the aforementioned tables and maps, a customer database can be populated with a system filter view (SFV 424), a supplemental join view (SJV 425), a supplemental SQL view (SSV 426), as well as other views.

Figure 5:
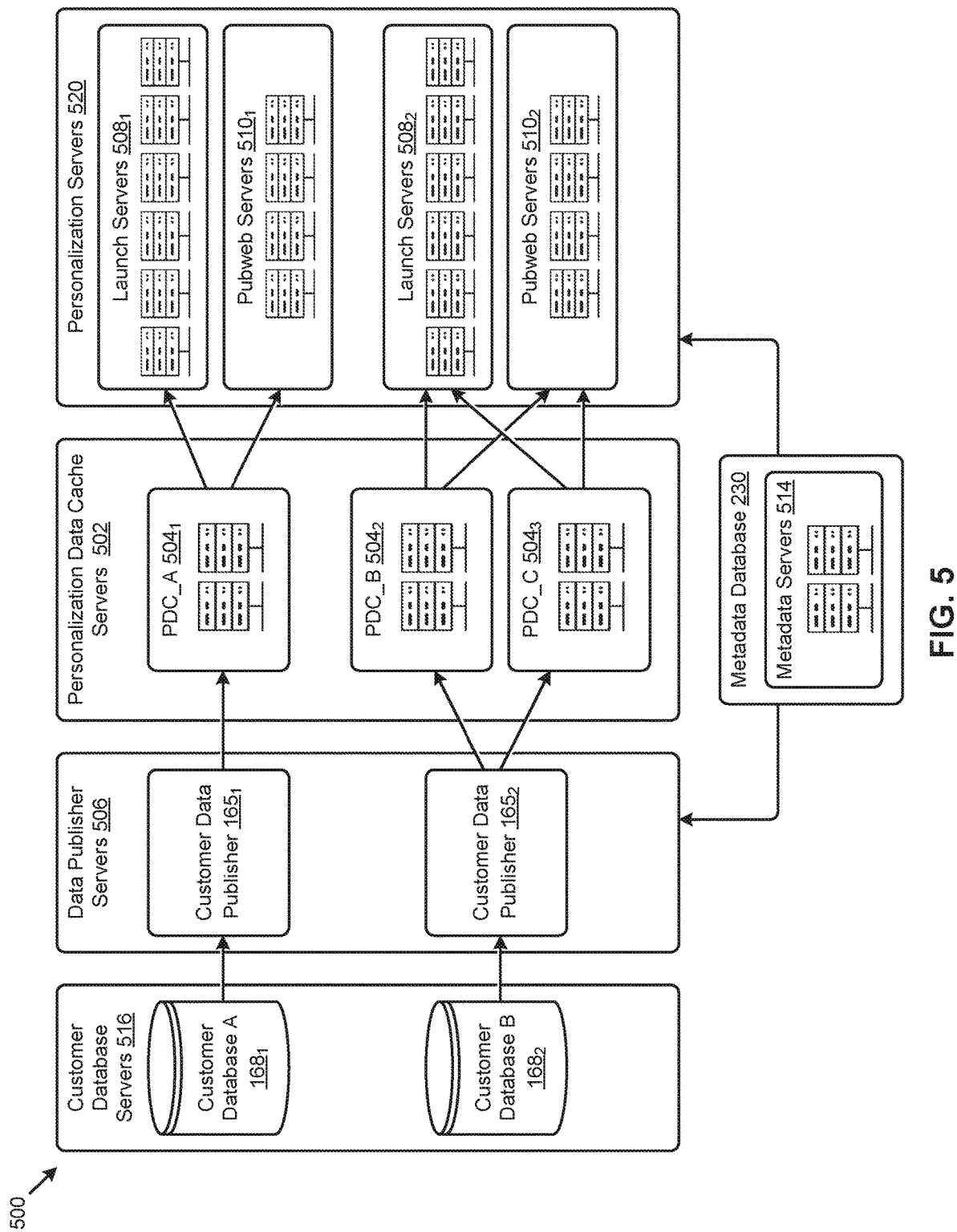
FIG. 5 depicts a server mapping for implementing marketing program systems in which one or more embodiments of the disclosure may be practiced.

FIG. 5 depicts a server mapping 500 for implementing marketing program systems in which one or more embodiments of the disclosure may be practiced. As an option, one or more instances of server mapping 500 or any aspect thereof may be implemented in the context of the architecture and functionality of the embodiments described herein. Also, the server mapping 500 or any aspect thereof may be implemented in any desired environment.

The embodiment shown in FIG. 5 includes a collection of personalization data cache servers 502, which in turn comprises personalization data cache servers PDC_A $504_1$, personalization data cache server PDC_B $504_2$, and personalization data cache server PDC_C $504_3$. Any servers from among the collection of personalization data cache servers can receive inputs from any one or more from among the shown collection of data publisher servers 506. The shown collection of data publisher servers includes an instance of customer data publisher $165_1$ and an instance of customer data publisher $165_2$, any of which can receive inputs from customer database servers 516.

As can be understood by those skilled in the art, any server or servers downstream from the personalization data cache servers 502 can access data from a cache rather than from the customer databases. For example, a collection of personalization servers 520 often includes one or more launch servers (e.g., launch servers $508_1$, launch servers $508_2$) and one or more publication servers (e.g., pubweb servers $510_1$, pubweb servers $510_2$).

The pubweb servers listen for HTTP requests from "click-through" events and initiates other actions on the basis of receiving the event. For example, a pubweb server can initiate the formation of links that are in turn sent out in messages for highly-targeted campaigns. The link that is clicked on by a recipient can cause a web page to be displayed in the user's browser. As such the web page(s) can be personalized. Pubweb servers are situated in the environment so as retrieve data from the personalization data cache servers.

Any server anywhere and/or in any collection of servers can access the metadata database 230, which may be implemented using one or more metadata servers 514. The shown mapping is purely exemplary, and other mappings or variations are possible. In some cases, a particular server is configured as an application server to access a query server, and a personalization data cache server is configured as a personalization data cache server.

Figure 6:
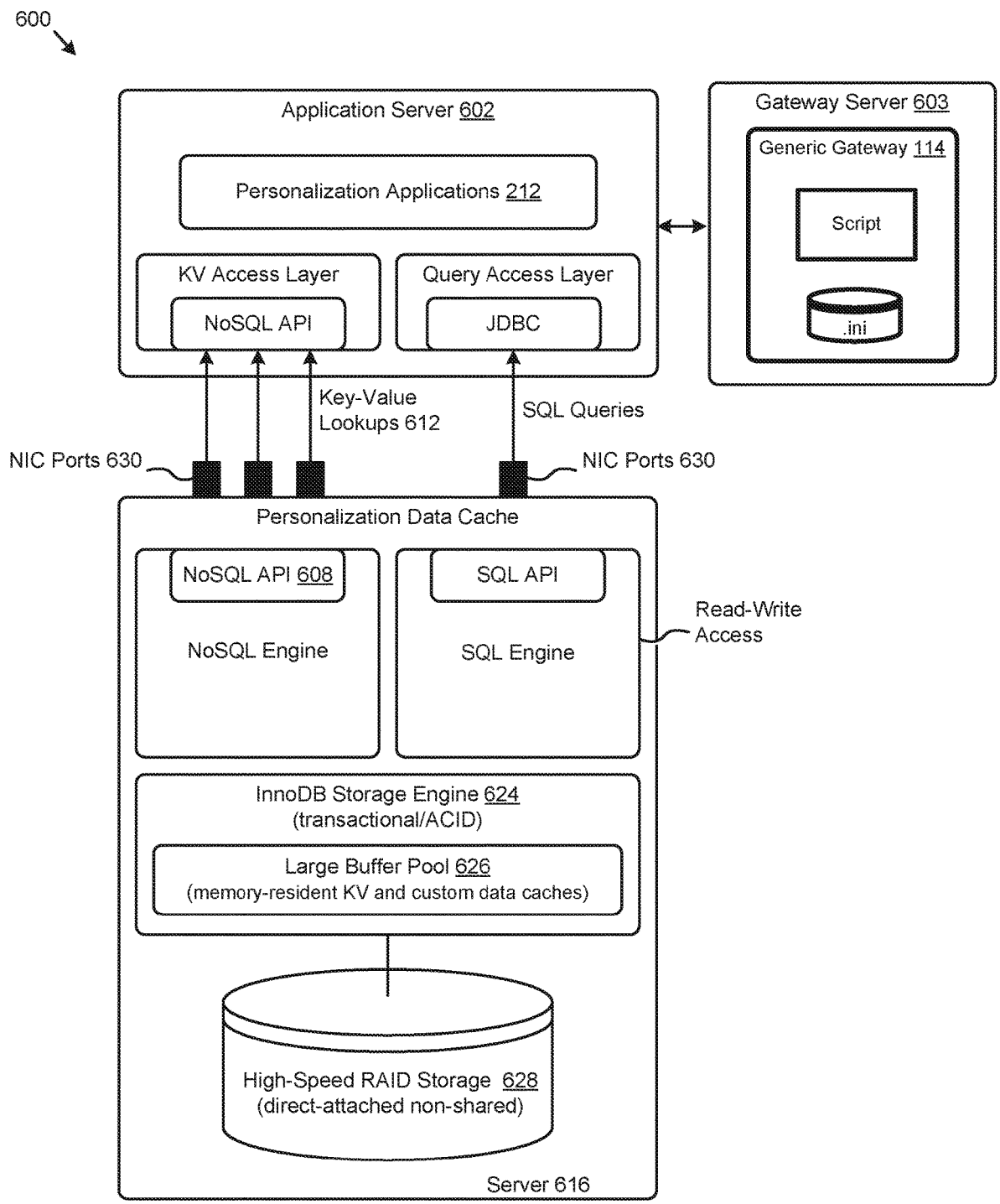
FIG. 6 presents a data cache architecture within which one or more embodiments of the disclosure may be practiced.

FIG. 6 presents a data cache architecture 600 within which one or more embodiments of the disclosure may be practiced. As an option, one or more instances of data cache architecture 600 or any aspect thereof may be implemented in the context of the architecture and functionality of the embodiments described herein. Also, the data cache architecture 600 or any aspect thereof may be implemented in any desired environment.

As earlier indicated, the data cache can be implemented using any suitable data caching system. In some embodiments, the data cache is implemented using a SQL engine. The architecture offers many benefits including a high-performance NoSQL API 608 that offers interfaces directly to the InnoDB storage engine 624, thus bypassing the overhead of a SQL API and SQL engine. In some cases, and as shown, the InnoDB storage engine 624 includes a large buffer pool 626 in front of an array of high-speed RAID storage 628.

In some deployments, performance is facilitated by use of multiple high-speed (e.g., 10 Gbps) Ethernet ports (e.g., NIC ports 630). Key value lookups 612 can be accomplished at a rate of over 750 queries per second, whereas deployments with fewer ports might support a lesser rate of queries per second. In one approach, the high-performance pairing between at least one application server 602 and at least one personalization data cache using a server 616 can be instantiated within a system, such as is shown and described as pertains to FIG. 2, so as to implement a high-performance data cache. A gateway server 603 can be deployed in communication with an application server 602 so as to offload communication activities from the application server. A single gateway server can host multiple generic gateway instances, any of which can be customized implement communication gateway services for any number of external communication partner systems.

Figure 7:
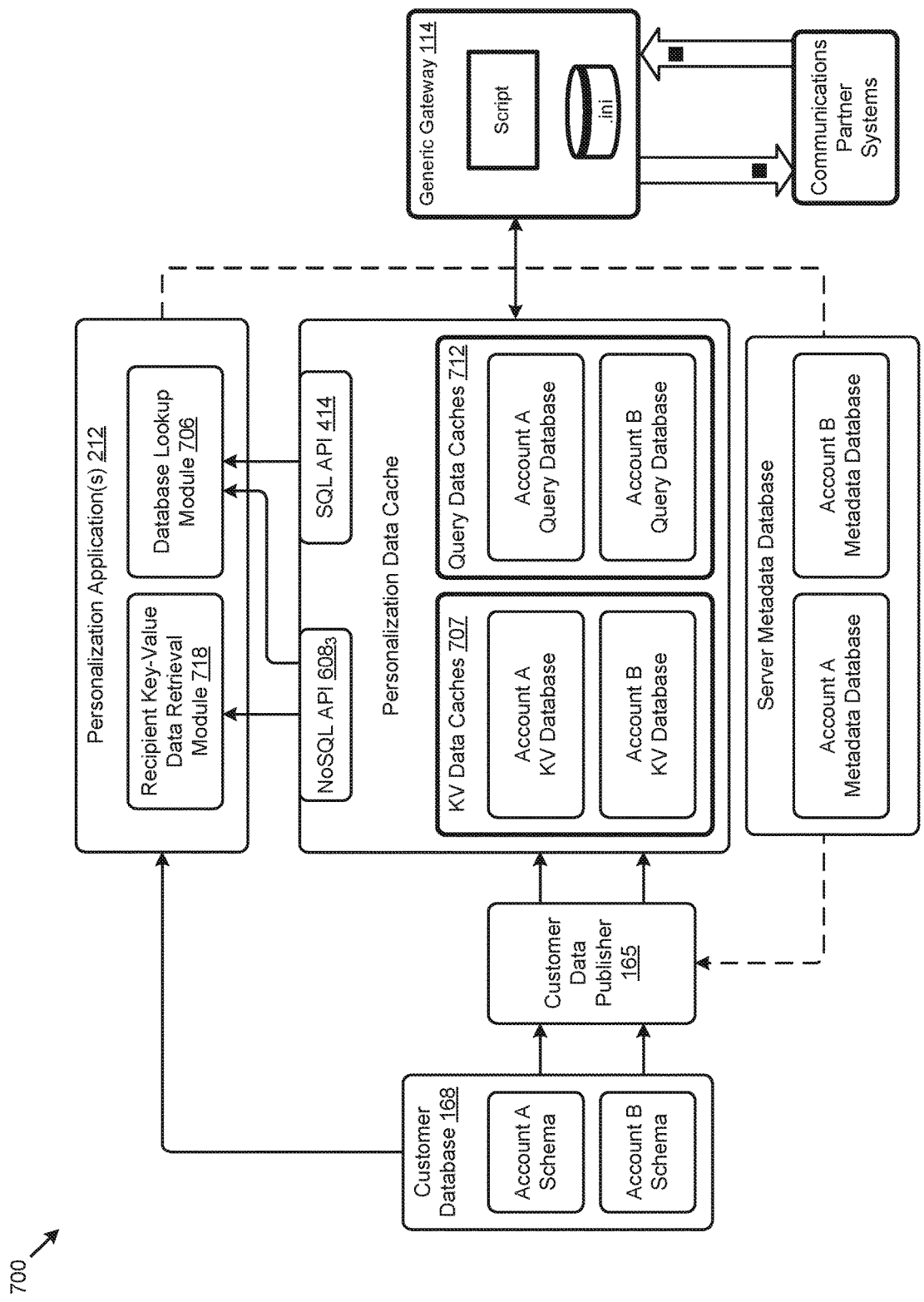
FIG. 7 illustrates a data cache access approach used by personalization applications to implement communication gateway services in a networked message distribution system, according to an embodiment.

FIG. 7 illustrates a data cache access approach 700 used by personalization applications to implement communication gateway services in a networked message distribution system. As an option, one or more instances of data cache access approach 700 or any aspect thereof may be implemented in the context of the architecture and functionality of the embodiments described herein. Also, the data cache access approach 700 or any aspect thereof may be implemented in any desired environment.

A data cache can be implemented using any suitable data system. In some embodiments, a server or collection of servers such as the shown personalization data cache implements the data cache. The data cache includes key-value data caches (e.g., KV data caches 707) and query data caches (e.g., query data cache 712). Additionally, such a data cache can be advantageously accessed by personalization applications and/or their constituent components such as a recipient key-value data retrieval module 718 and/or a database lookup module 706.

Any of the aforementioned components or applications can be configured to supply age-based policies that are used (e.g., by personalization data cache) for determining database cache hits in accordance with the age-based policies. Moreover, the architecture underlying the data cache access approach 700 can be mapped into a high-availability configuration.

Figure 8:
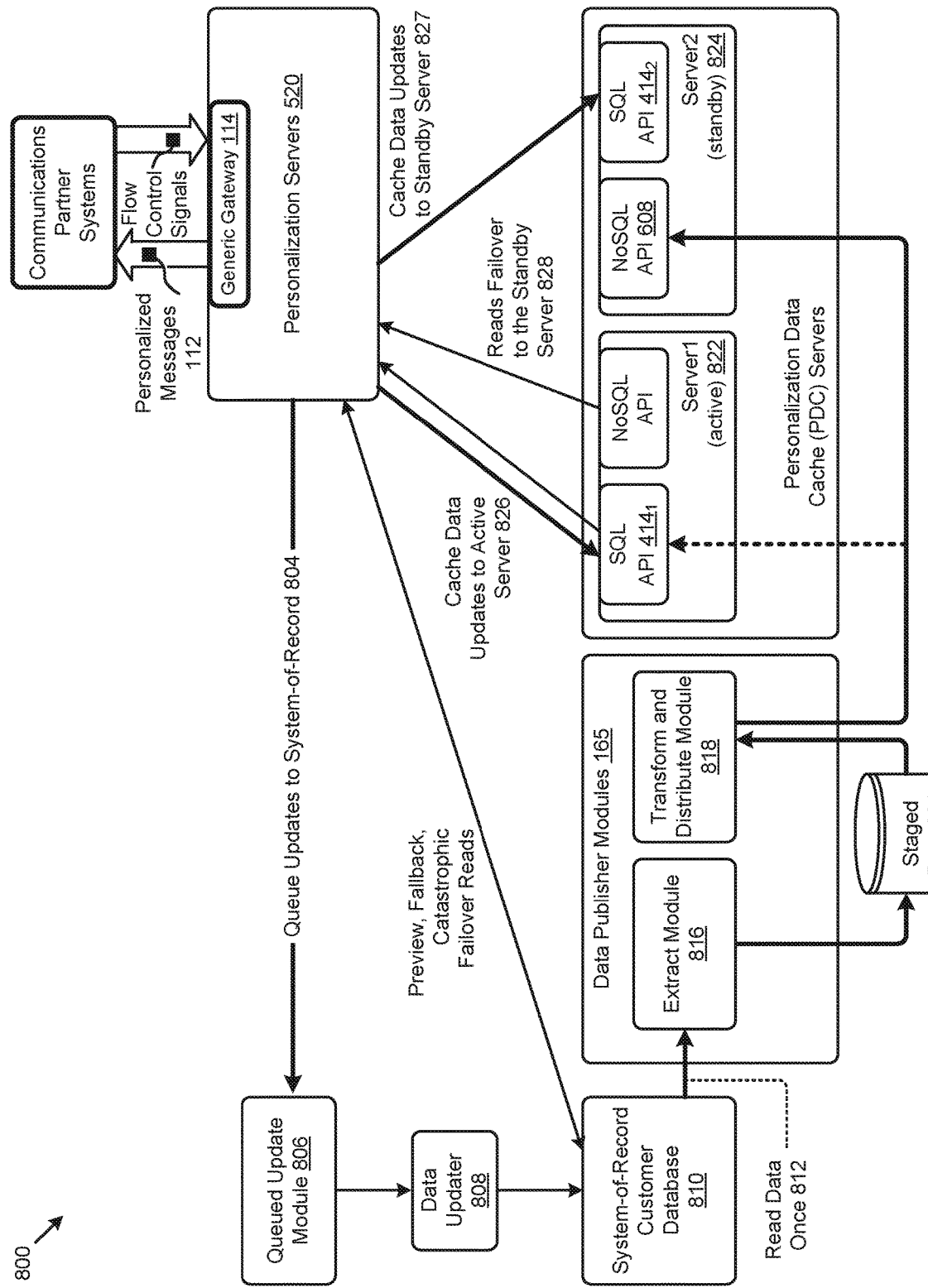
FIG. 8 illustrates a high-availability personalization data cache in which one or more embodiments of the disclosure may be practiced.

FIG. 8 illustrates a high-availability personalization data cache 800 in which one or more embodiments of the disclosure may be practiced. As an option, one or more instances of a high-availability personalization data cache 800 or any aspect thereof may be implemented in the context of the architecture and functionality of the embodiments described herein. Also, the high-availability personalization data cache 800 or any aspect thereof may be implemented in any desired environment.

As previously noted, high availability can be provided in some embodiments of the disclosure. FIG. 8 illustrates an approach to implement high availability. This is provided, for example, by publishing to a standby server. Reading can occur from the active server.

Referring to the flow stemming from the system-of-record customer database 810, a high availability version of a customer data publisher can read data (e.g., see path to read data once 812) and then commence to extract data (see extract module 816), store it to a location for staged data 820, which staged data is, in turn, read by a transform and distribute module 818. The aforementioned operations can occur while a PDC server is in active operation. Meanwhile, one or more instances of personalization servers 520 operates to avoid contention with any data publisher(s). Further, the one or more instances of personalization servers can provide functions such as previews, fallback, and catastrophic failover reads. The PDC servers host both an "active" server1 822 and a "standby" server2 824. Data from the staged data is distributed to the "active" sever and "standby" server at the election of the transform and distribute module 818. Cache data is updated to the active server (see path 826) concurrently with cache data being updated to the standby server (see path 827). The cache data being updated to the standby server can derive from activity at the active server (see path 828). Activity that results in changes to be reflected in the system-of-record are queued (see message 804), and a queued update module 806 in conjunction with a data updater 808 handles applying changes to the customer database.

Figure 9:
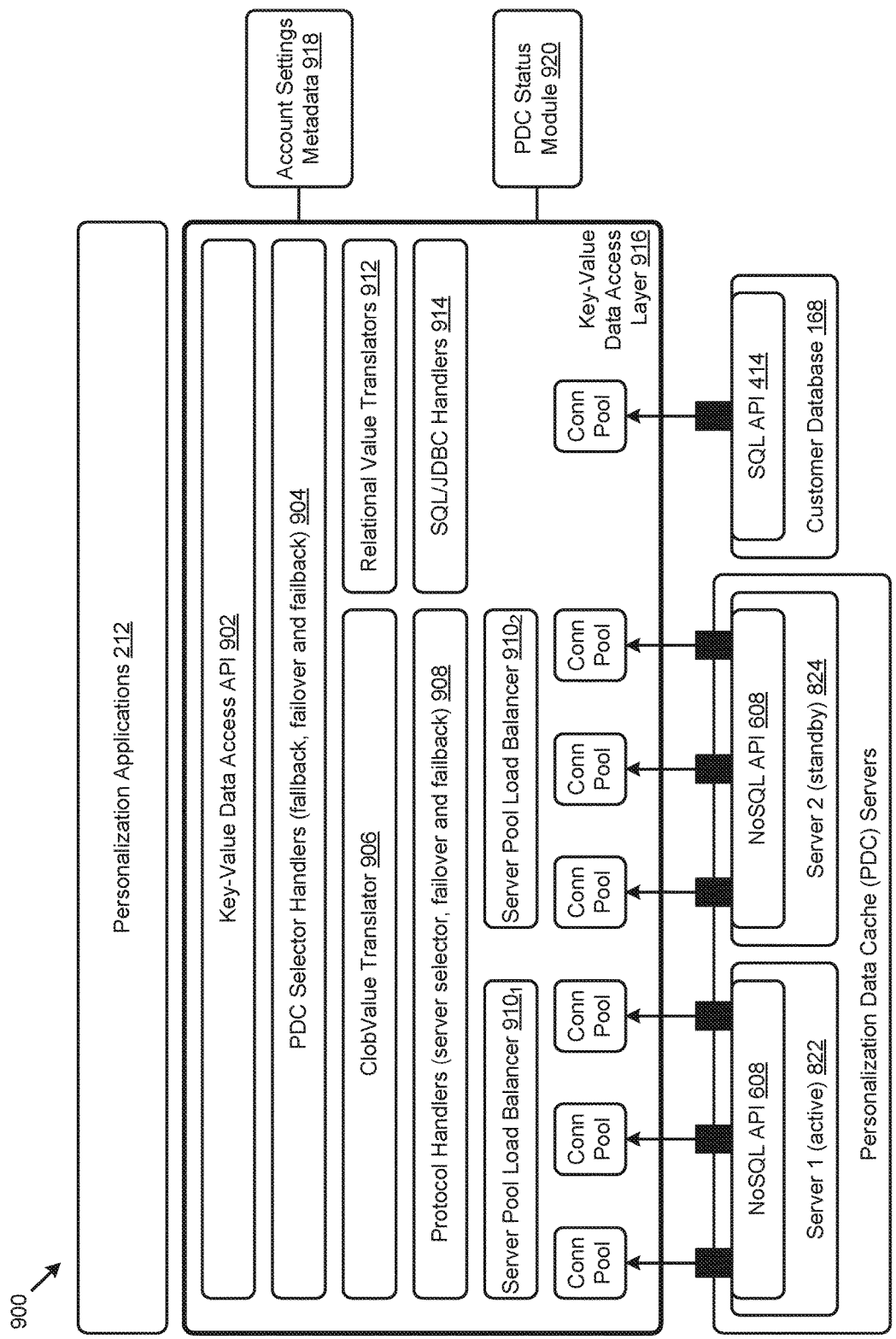
FIG. 9 depicts a parallel access personalization data cache use model within which one or more embodiments of the disclosure may be practiced.

FIG. 9 depicts a parallel access personalization data cache use model 900 within which one or more embodiments of the disclosure may be practiced. As an option, one or more instances of parallel access personalization data cache use model 900 or any aspect thereof may be implemented in the context of the architecture and functionality of the embodiments described herein. Also, the parallel access personalization data cache use model 900 or any aspect thereof may be implemented in any desired environment.

Cached data can be accessed using key- or field-based lookups. These data access use cases do not expose SQL query semantics and do not require a SQL solution. FIG. 9 illustrates an approach that can be taken to implement key-value lookups according to some embodiments of the disclosure. In this particular embodiment, personalization applications 212 communicate with a PDC server through a specialized key-value data access API. The key-value data access layer 916 can be configured through the use of metadata, which metadata can be derived from account settings metadata (see module 918). Real-time or near real-time status of the PDC server can be reported using a PDC status module 920.

Access by the personalization applications 212 is provided by a key-value data access API 902, which in turn interfaces with specialized handlers (e.g., PDC selector handlers 904, and protocol handlers 908), large character data object (CLOB) translators (e.g., clobvalue translators 906), relational value translators 912, load balancers (e.g., server pool load balancer 910$_1$, server pool load balancer 910$_2$) and SQL/JDBC handlers 914.

Figure 10:
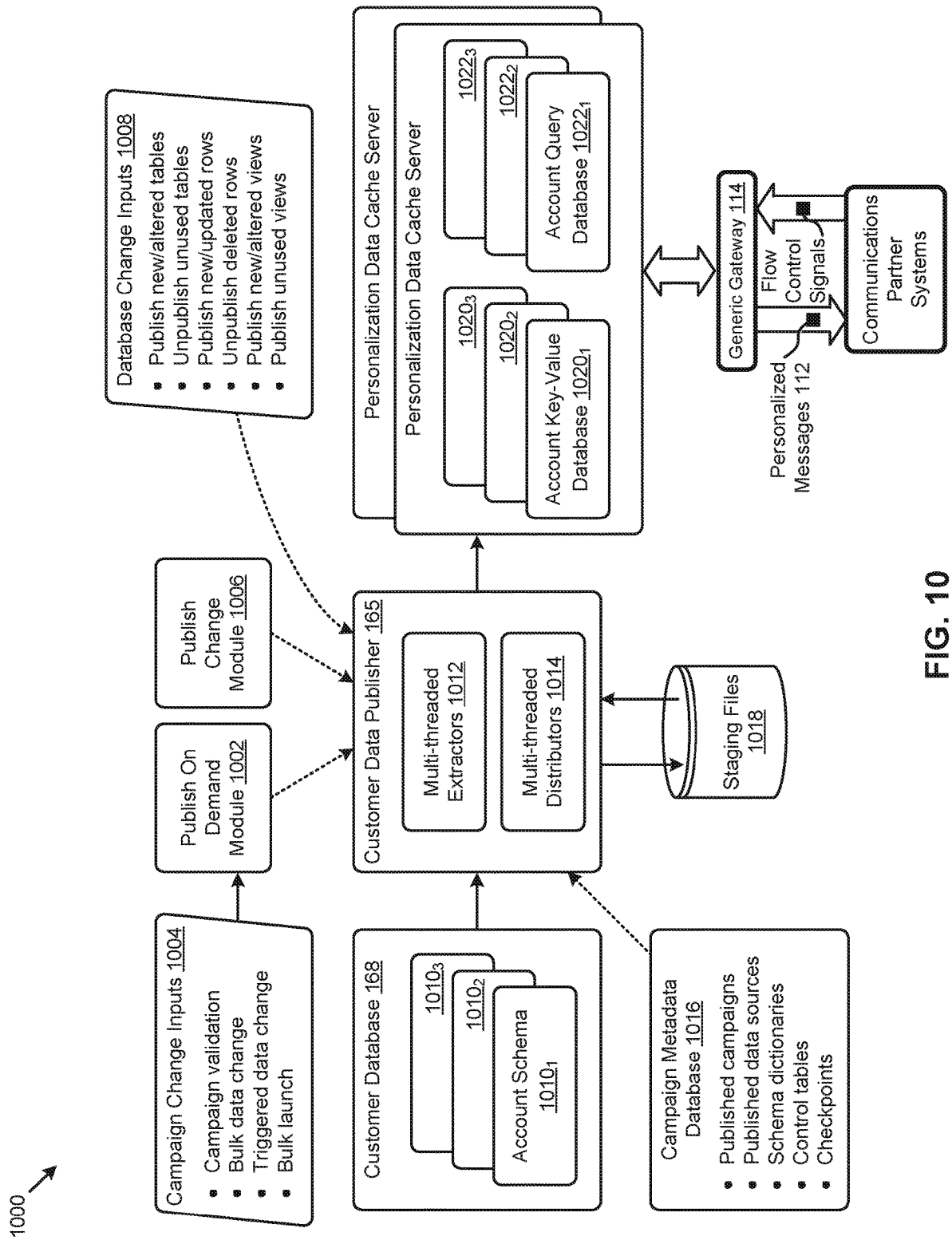
FIG. 10 depicts a personalization data cache population approach as used to implement communication gateway services in a networked message distribution system, according to some embodiments.

FIG. 10 depicts a personalization data cache population approach 1000 as used to implement communication gateway services in a networked message distribution system. As an option, one or more instances of personalization data cache population approach 1000 or any aspect thereof may be implemented in the context of the architecture and functionality of the embodiments described herein. Also, the personalization data cache population approach 1000 or any aspect thereof may be implemented in any desired environment.

FIG. 10 illustrates an approach that can be taken to allow customer data to be published (e.g., see publish on demand module 1002 and see publish change module 1006). In this approach, the data publisher comprises extractors and distributors that allow for customer data including data from the customer database, as well as a metadata database, to be published on demand (e.g., see campaign change inputs 1004).

The shown publish on demand module 1002 implements a set of rules to define the workflows provided to an instance of a customer data publisher, where the rules and workflows serve for extracting (see multi-threaded extractors 1012), transforming, and distributing the data to multiple target destinations (see multi-threaded distributors 1014). It is noted that the data models (e.g., account schemas 1010$_1$, account schemas 1010$_2$, account schemas 1010$_3$, etc.) used in a customer database may change; moreover there may be ongoing changes to database contents (e.g., see database change inputs 1008). The data publisher should be able to detect changes in the data model, and to appropriately send data to the data store as a result. Rules can be configured to implement this functionality. A campaign metadata database 1016 holds historical and/or currently-in-prosecution campaign data so as to facilitate changes in the customer database. In some cases the determination of a change in a customer database requires accessing multiple data sources; accordingly, a storage for staging files 1018 is made accessible to the customer data publisher.

Instances of a data publisher modules 165 interact with instances of PDC servers, which in turn serve to manage occurrences of account key-value databases (see account KV database 1020$_1$, account KV database 1020$_2$, account KV database 1020$_3$, etc.) and which customer data publisher instances further serve to manage occurrences of account query databases (see account query database 1022$_1$, account query database 1022$_2$, account query database 1022$_3$, etc.).

Additional Embodiments of the Disclosure

Additional Practical Application Examples

Figure 11:
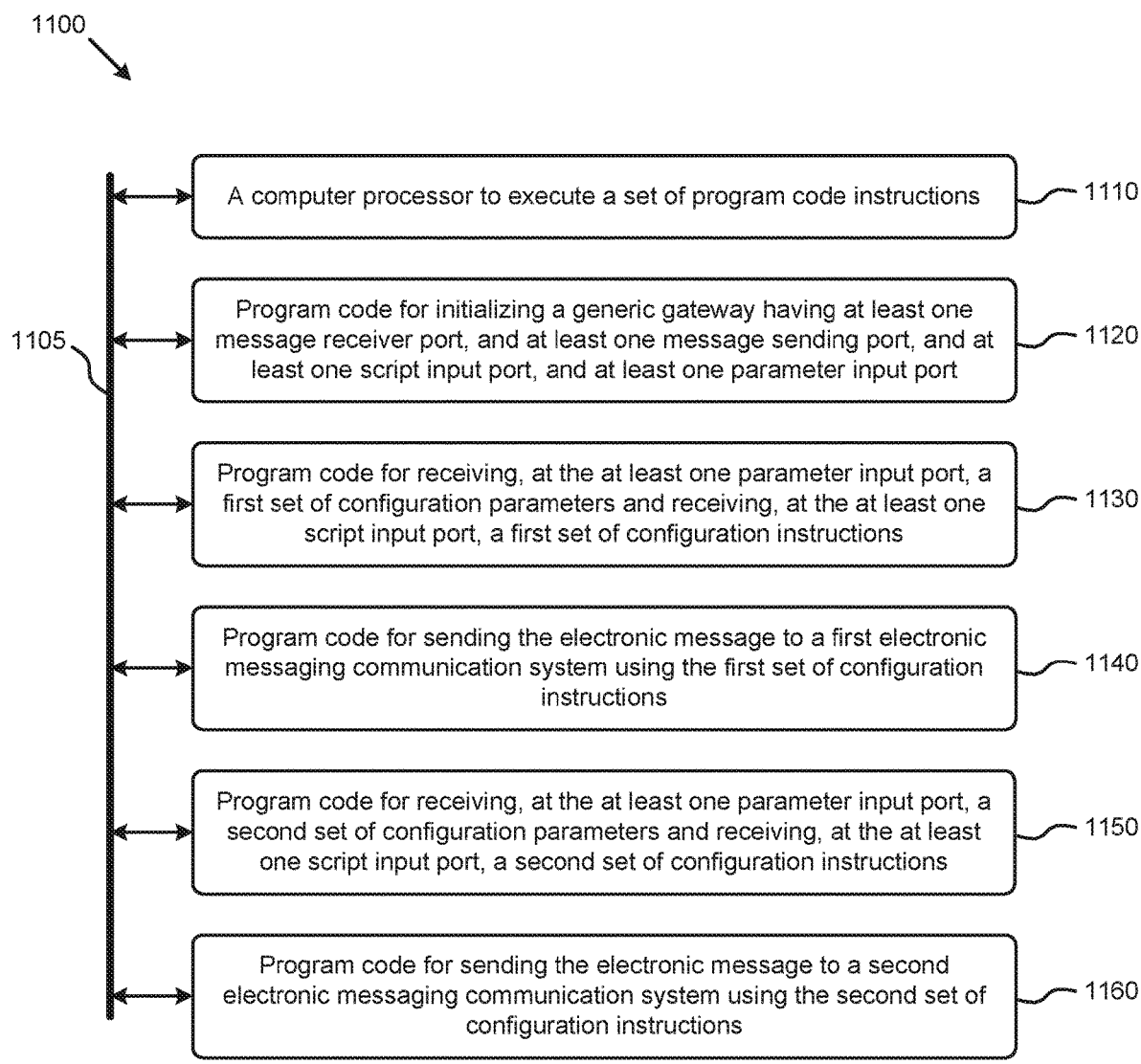
FIG. 11 depicts system components as an arrangement of computing modules that are interconnected so as to operate cooperatively to implement certain of the herein-disclosed embodiments.

FIG. 11 depicts system components as an arrangement of computing modules that are interconnected so as to operate cooperatively to implement certain of the herein-disclosed embodiments. As an option, the present system 1100 may be implemented in the context of the architecture and functionality of the embodiments described herein. Of course, however, the system 1100 or any operation therein may be carried out in any desired environment. The system 1100 comprises at least one processor and at least one memory, the memory serving to store program instructions corresponding to the operations of the system. As shown, an operation can be implemented in whole or in part using program instructions accessible by a module. The modules are connected to a communication path 1105, and any operation can communicate with other operations over communication path 1105. The modules of the system can, individually or in combination, perform method operations within system 1100. Any operations performed within system 1100 may be performed in any order unless as may be specified in the claims.

The shown embodiment implements a portion of a computer system, presented as system 1100, comprising a computer processor to execute a set of program code instructions (see module 1110) and modules for accessing memory to hold program code instructions to perform: initializing a generic gateway having at least one message receiver port, and at least one message sending port, and at least one script input port, and at least one parameter input port (see module 1120); receiving, at the at least one parameter input port, a first set of configuration parameters and receiving, at the at least one script input port, a first set of configuration instructions (see module 1130); sending the electronic message to a first electronic messaging communication system using the first set of configuration instructions (see module 1140); receiving, at the at least one parameter input port, a second set of configuration parameters and receiving, at the at least one script input port, a second set of configuration instructions (see module 1150); and sending the electronic message to a second electronic messaging communication system using the second set of configuration instructions (see module 1160).

In exemplary embodiments the aforementioned ports receive scripts and/or configuration parameters. The scripts (e.g., instructions) and parameters (e.g., values) either singly or in combination pertain to connection handling, and/or polling control, and/or communication security, and/or middleware communications, and/or payload formatting, and/or API handling, and/or response handling.

Figure 12:
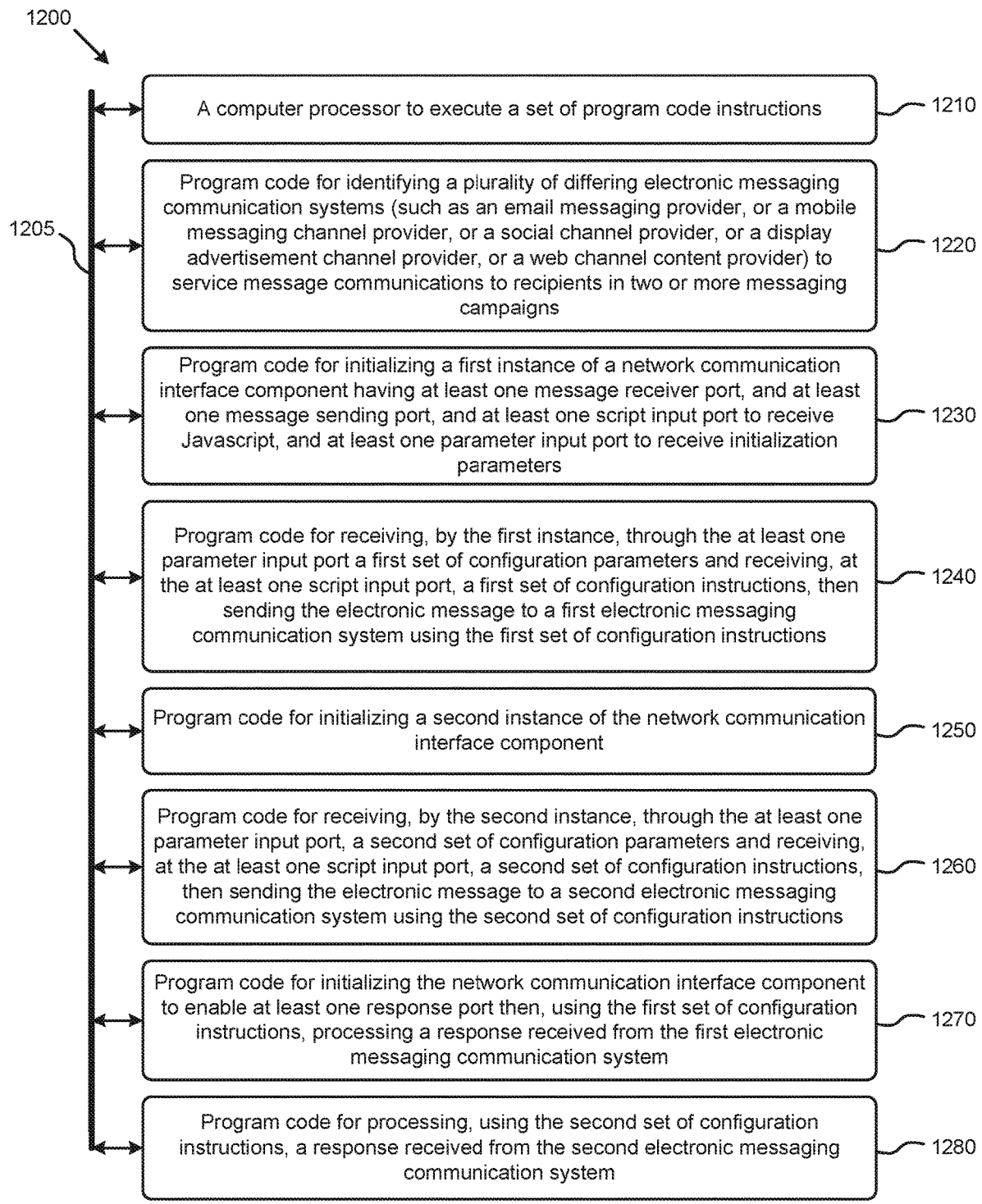
FIG. 12 depicts system components as an arrangement of computing modules that are interconnected so as to operate cooperatively to implement certain of the herein-disclosed embodiments.

FIG. 12 depicts as an arrangement 1200 of computing modules that are interconnected so as to operate cooperatively to implement certain of the herein-disclosed embodiments. The partitioning of system components in arrangement 1200 is merely illustrative and other partitions are possible. As an option, the present system 1200 may be implemented in the context of the architecture and functionality of the embodiments described herein. Of course, however, the system 1200 or any operation therein may be carried out in any desired environment. The system 1200 comprises at least one processor and at least one memory, the memory serving to store program instructions corresponding to the operations of the system. As shown, an operation can be implemented in whole or in part using program instructions accessible by a module. The modules are connected to a communication path 1205, and any operation can communicate with other operations over communication path 1205. The modules of the system can, individually or in combination, perform method operations within system 1200. Any operations performed within system 1200 may be performed in any order unless as may be specified in the claims.

The shown embodiment implements a portion of a computer system, presented as system 1200, comprising a computer processor to execute a set of program code instructions (see module 1210) and modules for accessing memory to hold program code instructions to perform: identifying a plurality of differing electronic messaging communication systems (such as an email messaging provider, or a mobile messaging channel provider, or a social channel provider, or a display advertisement channel provider, or a web channel content provider) to service message communications to recipients in two or more messaging campaigns (see module 1220); initializing a first instance of a network communication interface component having at least one message receiver port, and at least one message sending port, and at least one script input port to receive Javascript, and at least one parameter input port to receive initialization parameters (see module 1230); receiving, by the first instance, through the at least one parameter input port a first set of configuration parameters and receiving, at the at least one least one script input port, a first set of configuration instructions, then sending the electronic message to a first electronic messaging communication system using the first set of configuration instructions (see module 1240); initializing a second instance of the network communication interface component (see module 1250); receiving, by the second instance, through the at least one parameter input port, a second set of configuration parameters and receiving, at the at least one least one script input port, a second set of configuration instructions, then sending the electronic message to a second electronic messaging communication system using the second set of configuration instructions (see module 1260); initializing the network communication interface component to enable at least one response port then, using the first set of configuration instructions, processing a response received from the first electronic messaging communication system (see module 1270); and processing, using the second set of configuration instructions, a response received from the second electronic messaging communication system (see module 1280).

System Architecture Overview

Additional System Architecture Examples

Figure 13A:
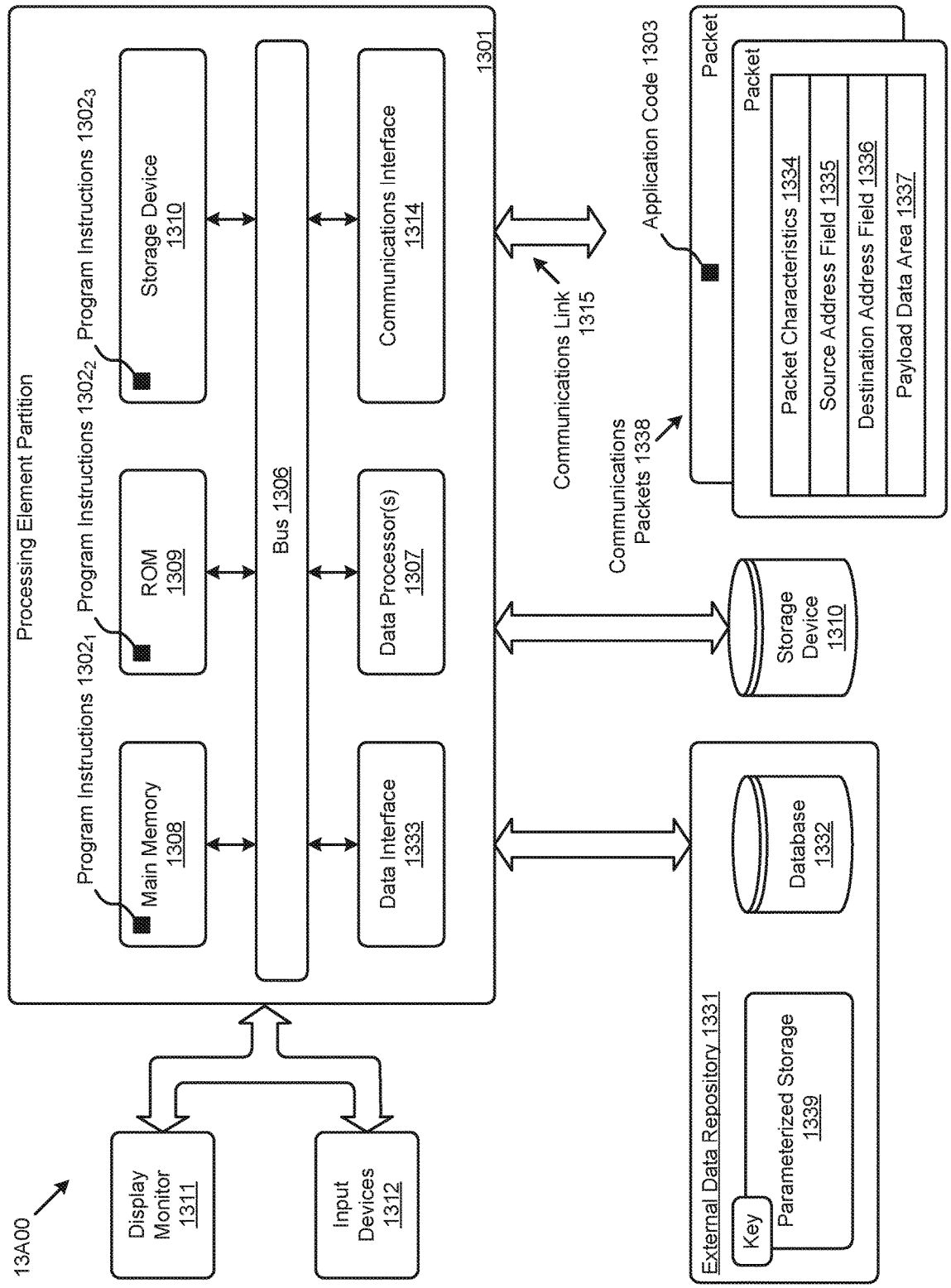
FIG. 13A, FIG. 13B, and FIG. 13C depict exemplary architectures of components suitable for implementing embodiments of the present disclosure, and/or for use in the herein-described environments.

FIG. 13A depicts a block diagram of an instance of a computer system 13A00 suitable for implementing embodiments of the present disclosure. Computer system 13A00 includes a bus 1306 or other communication mechanism for communicating information. The bus interconnects subsystems and devices such as a CPU, or a multi-core CPU (e.g., processor 1307), a system memory (e.g., main memory 1308, or an area of random access memory RAM), a non-volatile storage device or non-volatile storage area (e.g., ROM 1309), an internal or external storage device 1310 (e.g., magnetic or optical), a data interface 1333, a communications interface 1314 (e.g., PHY, MAC, Ethernet interface, modem, etc.). The aforementioned components are shown within processing element partition 1301, however other partitions are possible. The shown computer system 13A00 further comprises a display 1311 (e.g., CRT or LCD), various input devices 1312 (e.g., keyboard, cursor control), and an external data repository 1331.

According to an embodiment of the disclosure, computer system 13A00 performs specific operations by processor 1307 executing one or more sequences of one or more program code instructions contained in a memory. Such instructions (e.g., program instructions $1302_1$, program instructions $1302_2$, program instructions $1302_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 13A00 performs specific networking operations using one or more instances of communications interface 1314. Instances of the communications interface 1314 may comprise one or more networking ports that are configurable (e.g., pertaining to speed, protocol, physical layer characteristics, media access characteristics, etc.) and any particular instance of the communications interface 1314 or port thereto can be configured differently from any other particular instance. Portions of a communication protocol can be carried out in whole or in part by any instance of the communications interface 1314, and data (e.g., packets, data structures, bit fields, etc.) can be positioned in storage locations within communications interface 1314, or within system memory, and such data can be accessed (e.g., using random access addressing, or using direct memory access DMA, etc.) by devices such as processor 1307.

The communications link 1315 can be configured to transmit (e.g., send, receive, signal, etc.) communications packets 1338 comprising any organization of data items. The data items can comprise a payload data area 1337, a destination address 1336 (e.g., a destination IP address), a source address 1335 (e.g., a source IP address), and can include various encodings or formatting of bit fields to populate the shown packet characteristics 1334. In some cases the packet characteristics include a version identifier, a packet or payload length, a traffic class, a flow label, etc. In some cases the payload data area 1337 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 1307 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1331, which in turn can be formatted into any one or more storage areas, and which can comprise parameterized storage 1339 accessible by a key (e.g., filename, table name, block address, offset address, etc.).

Execution of the sequences of instructions to practice certain embodiments of the disclosure are performed by a single instance of the computer system 13A00. According to certain embodiments of the disclosure, two or more instances of computer system 13A00 coupled by a communications link 1315 (e.g., LAN, PTSN, or wireless network) may perform the sequence of instructions required to practice embodiments of the disclosure using two or more instances of components of computer system 13A00.

The computer system 13A00 may transmit and receive messages such as data and/or instructions organized into a data structure (e.g., communications packets 1338). The data structure can include program instructions (e.g., application code 1303), communicated through communications link 1315 and communications interface 1314. Received program code may be executed by processor 1307 as it is received and/or stored in the shown storage device or in or upon any other non-volatile storage for later execution. Computer system 13A00 may communicate through a data interface 1333 to a database 1332 on an external data repository 1331. Data items in a database can be accessed using a primary key (e.g., a relational database primary key).

The processing element partition 1301 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 1307. Some embodiments include one or more special-purpose hardware components (e.g., power control, logic, sensors, transducers, etc.). A module may include one or more state machines and/or combinational logic used to implement or facilitate the acts of performing communication gateway services in a networked message distribution system.

Various implementations of the database 1332 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of communication gateway services in a networked message distribution system). Such files or records can be brought into and/or stored in volatile or non-volatile memory.

Figure 13B:
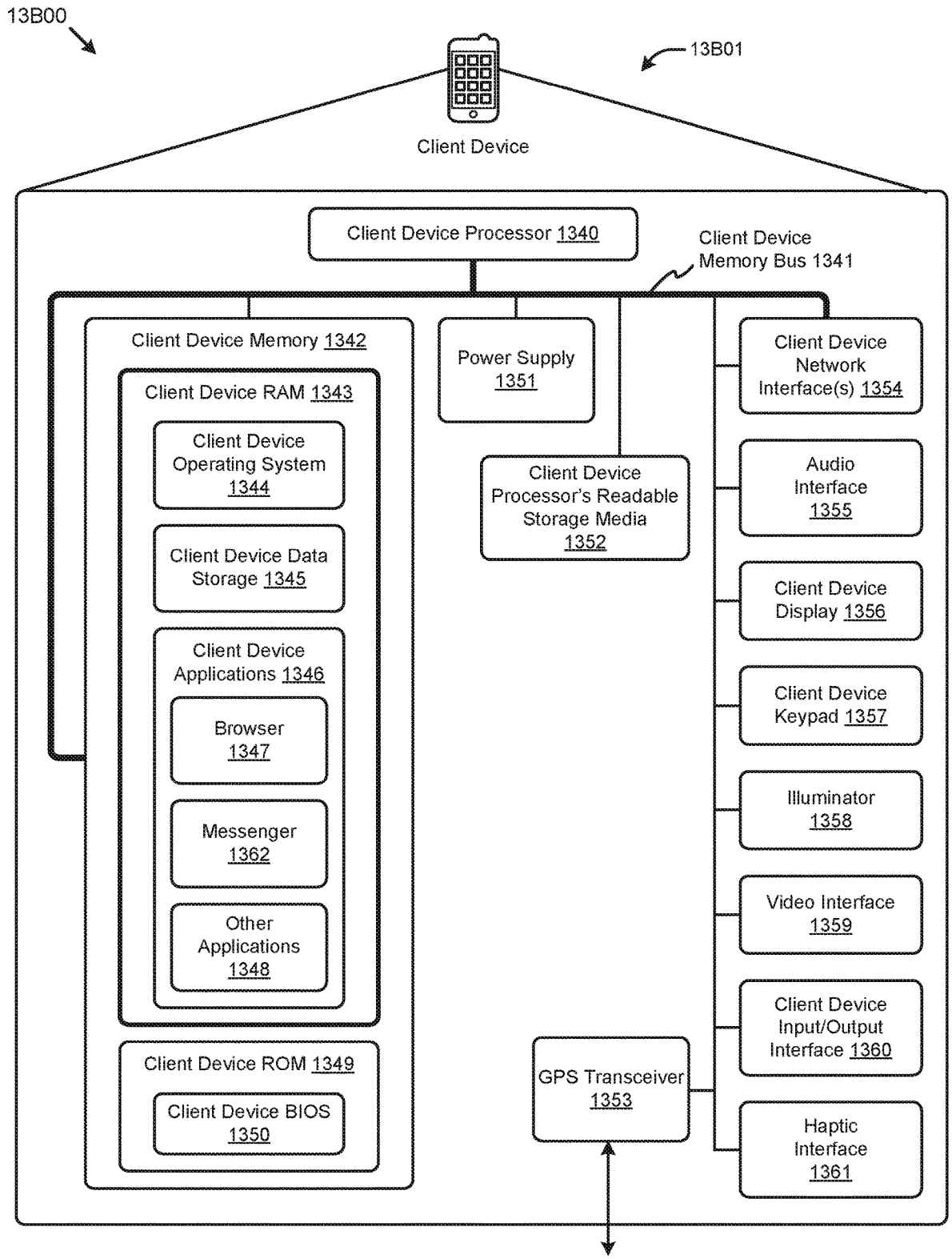

FIG. 13B depicts a block diagram 13B00 of an instance of a client device 13B01 that may be included in a system implementing instances of the herein-disclosed embodiments. Client device 13B01 may include many more or fewer components than those shown in FIG. 13B. Client device 13B01 may represent, for example, an embodiment of at least one of client devices as heretofore disclosed.

As shown in the figure, client device 13B01 includes a client device processor 1340 in communication with a client device memory 1342 via a client device memory bus 1341. Client device 13B01 also includes a power supply 1351, one or more client device network interfaces 1354, an audio interface 1355, a client device display 1356, a client device keypad 1357, an illuminator 1358, a video interface 1359, a client device IO interface 1360, a haptic interface 1361, and a GPS transceiver 1353 for global positioning services.

The power supply 1351 provides power to client device 13B01. A rechargeable or non-rechargeable battery may be used to provide power. The power may also be provided by an external power source such as an AC adapter or a powered docking cradle that supplements and/or recharges a battery.

A client device 13B01 may optionally communicate with a base station, or directly with another computing device. A client device network interface 1354 includes circuitry for coupling a client device 13B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 1355 is arranged to produce and receive audio signals such as the sound of a human voice. For example, audio interface 1355 may be coupled to a speaker and microphone to enable telecommunication with others and/or generate an audio acknowledgement for some action.

A client device display 1356 may be a liquid crystal display (LCD), gas plasma, light emitting diode (LED), or any other type of display used with a computing device. A client device display 1356 may also include a touch sensitive screen arranged to receive input from an object such as a stylus or a digit from a human hand.

A client device keypad 1357 may comprise any input device arranged to receive input from a user. For example, client device keypad 1357 may include a push button numeric dial, or a keyboard. A client device keypad 1357 may also include command buttons that are associated with selecting and sending images.

An illuminator 1358 may provide a status indication and/or provide light. Illuminator 1358 may remain active for specific periods of time or in response to events. For example, when the illuminator 1358 is active, it may backlight the buttons on client device keypad 1357 and stay on while the client device is powered. Also, the illuminator 1358 may backlight these buttons in various patterns when particular actions are performed such as dialing another client device. An illuminator 1358 may also cause light sources positioned within a transparent or translucent case of the client device to illuminate in response to actions.

A video interface 1359 is arranged to capture video images such as a still photo, a video segment, an infrared video or the like. For example, the video interface 1359 may be coupled to a digital video camera, a web-camera or the like. A video interface 1359 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 13B01 comprise a client device IO interface 1360 for communicating with external devices such as a headset, or other input or output devices not shown in FIG. 13B. The client device IO interface 1360 can use one or more communication technologies such as a USB, infrared, Bluetooth™ port or the like. A haptic interface 1361 is arranged to as a human interface device (HID) to facilitate interaction with a user of a client device. Such interaction can include tactile feedback to a user of the client device. For example, the haptic interface 1361 may be employed to cause vibration of the client device 13B01 in a particular way (e.g., with a pattern or periodicity) and/or when interacting with one or another user.

A GPS transceiver 1353 can determine the physical coordinates of client device 13B01 on the surface of the Earth. The GPS transceiver 1353, in some embodiments, may be optional. The shown GPS transceiver 1353 outputs a location such as a latitude value and a longitude value. However, the GPS transceiver 1353 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 13B01 on the surface of the Earth. It is understood that under different conditions, a GPS transceiver 1353 can determine a physical location within millimeters for client device 13B01; and in other cases, the determined physical location may be less precise such as within a meter or significantly greater distances. In certain embodiments, the client device 13B01 may provide other information that may be employed to determine a physical location of the device including, for example, a media access control (MAC) address, IP address, IP port identifier, or the like.

The client device memory 1342 includes random access memory 1343, read-only memory 1349, and other computer-readable storage. The client device memory 1342 illustrates an example of computer readable storage media (devices) for storage of information such as computer readable instructions, data structures, program modules or other data. The client device memory 1342 stores a basic IO system (BIOS) in the embodiment of client device BIOS 1350 for controlling low-level operation of client device 13B01. The memory also stores an operating system 1344 for controlling the operation of client device 13B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include or interface with a Java virtual machine module that enables control of hardware components and/or operating system operations via Java application programs.

The client device memory 1342 further includes one or more instances of client device data storage 1345, which can be used by client device 13B01 to store, among other things, client device applications 1346 and/or other data. For example, client device data storage 1345 may also be employed to store information that describes various capabilities of client device 13B01. The information may then be provided to another device based on any of a variety of events including being sent as part of a header during a communication, sent upon request or the like. Client device data storage 1345 may also be employed to store social networking information including address books, buddy lists, aliases, user profile information or the like. Further, client device data storage 1345 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 13B01, etc.

An instance of a client device processor's readable storage media 1352 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media may also be referred to herein as computer readable storage media.

The client device applications 1346 may include computer executable instructions which, when executed by client device 13B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1346 may include, for example, a messenger 1362, a browser 1347, and other applications 1348. Certain other applications 1348 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 1348 may collect and store user data that may be received from other computing devices in the environment.

A messenger 1362 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1362 may be configured as an IM application such as AOL (America Online) instant messenger, Yahoo! messenger, .NET messenger server, ICQ or the like. In certain embodiments, the messenger 1362 may be configured to include a mail user agent (MUA) such as Elm, Pine, message handling (MH), Outlook, Eudora, Mac Mail, Mozilla Thunderbird or the like. In another embodiment, the messenger 1362 may be a client device application that is configured to integrate and employ a variety of messaging protocols including, but not limited, to various push and/or pull mechanisms for client device 13B01. In certain embodiments, the messenger 1362 may interact with the browser 1347 for managing messages. As used herein, the term "message" refers to any of a variety of messaging formats, or communications form including, but not limited to, email, SMS, IM, MMS, IRC or the like.

A browser 1347 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1347 may enable a user of client device 13B01 to communicate with another network device as may be present in the environment.

Figure 13C:
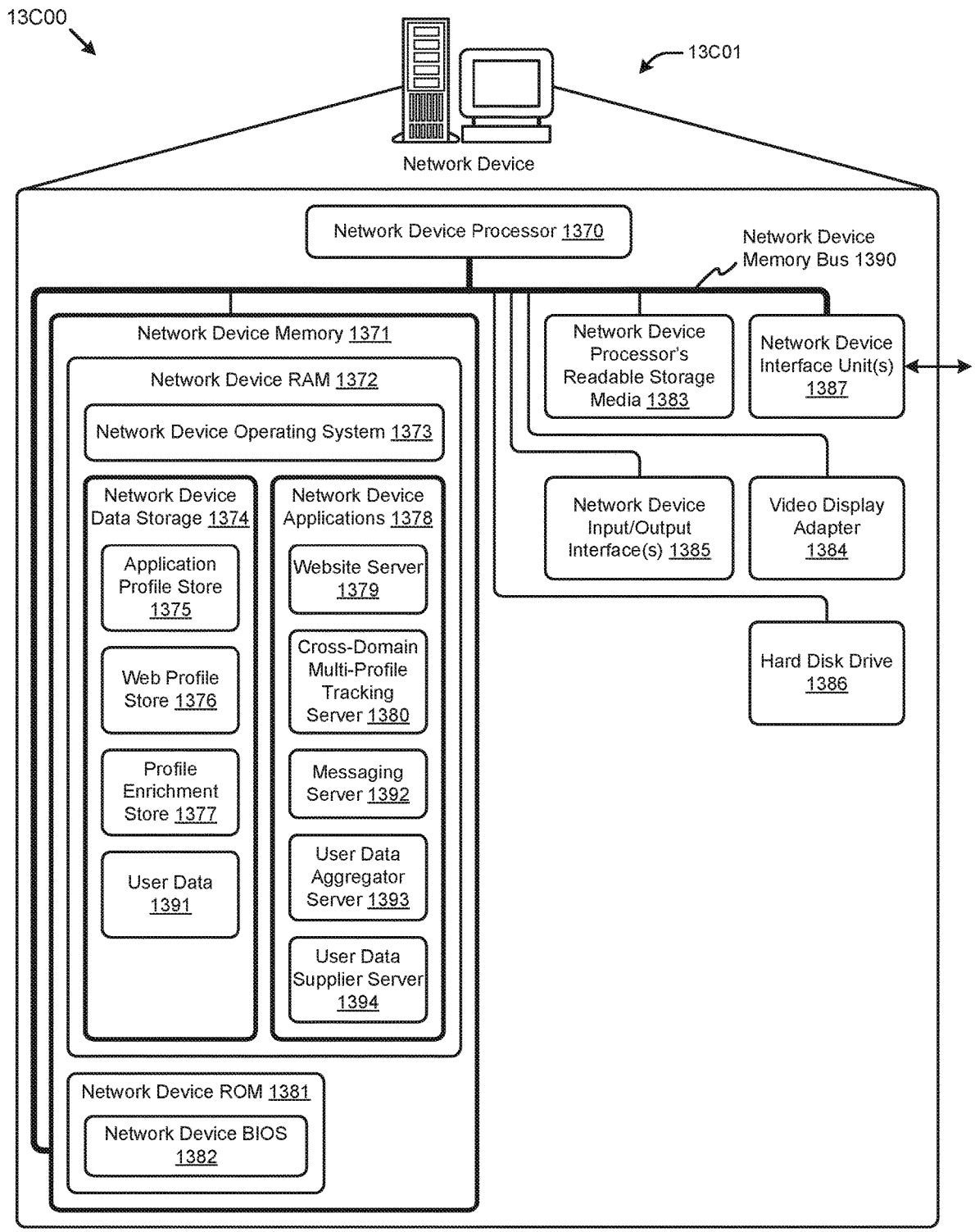

FIG. 13C depicts a block diagram 13C00 of an instance of a network device 13C01 that may be included in a system implementing instances of the herein-disclosed embodiments. Network device 13C01 may include many more or fewer components than those shown. Network device 13C01 may be configured to operate as a server, client, peer, a host, or any other device.

The network device 13C01 includes at least one instance of a network device processor 1370, instances of readable storage media, one or more instances of a network interface unit 1387, a network device IO interface 1385, a hard disk drive 1386, a video display adapter 1384, and a network device memory 1371, all in communication with each other via a network device memory bus 1390. The network device memory generally includes network device RAM 1372, network device ROM 1381. Some embodiments include one or more non-volatile mass storage devices such as a hard disk drive 1386, a tape drive, an optical drive, and/or a floppy disk drive. The network device memory stores a network device operating system 1373 for controlling the operation of network device 13C01. Any general-purpose operating system may be employed. A basic input/output system (BIOS) is also provided in the form of network device BIOS 1382 for controlling the low-level operation of network device 13C01. As illustrated in FIG. 13C, a network device 13C01 also can communicate with the Internet, or some other communications network, via a network interface unit 1387, which is constructed for use with various communication protocols including the TCP/IP protocol. A network interface unit 1387 is sometimes known as a transceiver, a transceiving device, or a network interface card (NIC). Network device 13C01 also comprises a network device IO interface 1385 for communicating with external devices such as a keyboard or other input or output devices. A network device IO interface 1385 can use one or more communication technologies such as USB, infrared, Bluetooth™ or the like.

The storage devices as described above may use various types of computer readable media, namely tangible forms of non-volatile computer readable storage media and/or a client device processor's readable storage media 1352 and/or a network device processor's readable storage media 1383. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 1374 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1374 may further include program code, data, algorithms and the like, for use by a processor such as a network device processor 1370 to execute and perform actions. In certain embodiments, at least some of the logical contents of network device data storage 1374 might be stored on another component of network device 13C01 such as on a second instance of hard disk drive 1386 or on an external/removable storage device.

The network device data storage 1374 may further store any portions of application data and/or user data such as an application profile store 1375, a web profile store 1376, a profile enrichment store 1377 and/or any user data collected. In some embodiments, user data 1391 may store unique user data, non-unique user data, aggregated user data, and/or any combination thereof. User data 1391 may include a variety of attributes such as a five digit zip code, an expanded nine digit zip code and the like.

The Network device data storage 1374 may also store program code and data. One or more network device applications 1378 may be loaded into network device data storage or any other mass memory, to be accessible to run with or as a part of network device operating system 1373. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1392, website server 1379, user data aggregator server 1393, a cross-domain multi-profile tracking server 1380, and/or user data supplier server 1394 may also be included within or implemented as application programs.

A messaging server 1392 may include virtually any computing component or components configured and arranged to forward messages from message user agents and/or other message servers, or to deliver messages to a local message store such as network device data storage 1374 or the like. Thus, a messaging server 1392 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1392 may also be managed by one or more components of the messaging server 1392. Thus, the messaging server 1392 may also be configured to manage SMS messages; IM, MMS, IRC, or RSS feeds; mIRC; or any of a variety of other message types. In certain embodiments, the messaging server 1392 may enable users to initiate and/or otherwise conduct chat sessions, VOIP sessions or the like.

A website server 1379 may represent any of a variety of information and services that are configured to provide content including messages, over a network to another computing device. Thus, a website server 1379 can include, for example, a web server, a file transfer protocol (FTP) server, a database server, a content server or the like. A website server 1379 may provide the content including messages over the network using any of a variety of formats including, but not limited to, WAP, HDML, WML, SGML, HTML, XML, compact HTML (cHTML), extensible HTML (xHTML) or the like. A website server 1379 may also be configured to enable a user of a client device to browse websites, upload user data, view and interact with advertisements or the like.

A user data aggregator server 1393 is configured to aggregate user data to be provided to user data buyers for advertising campaigns. In certain embodiments, a user data aggregator server 1393 may be configured to receive collected user data from a user data supplier server 1394. In some embodiments, a user data aggregator server 1393 may receive a query for user data. Based on the query, a user data aggregator server 1393 may generate a plurality of subsets of aggregated user data. In some embodiments, user data aggregator server 1393 may be included in a network device.

A user data supplier server 1394 is configured to collect user data. In certain embodiments, the user data supplier server 1394 may be configured to provide the collected user data to user data aggregator server 1393. In some embodiments, the user data supplier server 1394 may collect and/or provide unique user data and/or non-unique user data. In certain embodiments, the user data supplier server 1394 may aggregate the collected user data. In some embodiments, the user data supplier server 1394 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network including any sub-networks and/or wireless networks, are in communication with, and enables communication between components in the environment.

Instances of client devices may include virtually any computing device capable of communicating over a network to send and receive information including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method for capturing events from recipients of messages delivered over multiple communication channels, the method comprising:

receiving personalized messages for a plurality of intended recipients at a generic gateway, wherein the personalized messages are part of a messaging campaign being executed, content for at least a portion of the plurality of personalized messages is generated for specific intended recipients, and data about the specific intended recipients is stored in a database and, during execution of the messaging campaign, published to one or more cache instances such that the content for the portion of the plurality of personalized messages is generated by accessing the data about the specific intended recipients published to the cache instances;

generating first messages of a first message type formatted according to a messaging protocol of a first communication partner and second messages of a second message type formatted according to a messaging protocol of a second communication partner;

transmitting the first messages to the first communication partner and the second messages to the second communication partner, wherein the first communication partner is configured to deliver the first messages over a first communication channel and the second communication partner is configured to deliver the second messages over a second communication channel;

capturing events caused by one or more actions taken by a plurality of the intended recipients in response to one or more of the first messages and second messages, wherein the one or more actions taken comprise electronic interactions; and storing event data based on the captured events, wherein the event data is used to update the data about the specific intended recipients stored in the database, at least a portion of the updated data is published to the one or more cache instances during the execution of the messaging campaign, and content for additional personalized messages is generated using the updated data about the specific intended recipients.

2. The method of claim 1, wherein the first messages and the second messages are generated using content from the received personalized messages and comprise the intended recipients indicated by the received personalized messages.

3. The method of claim 2, wherein the first messages and second messages are delivered to the intended recipients that are indicated by the personalized messages.

4. The method of claim 2, wherein the one or more actions taken comprise at least one of replying to an email, navigating to a website, or completing a form.

5. The method of claim 2, wherein capturing events comprises listening, by a publication server, for an HTTP request from a clickthrough event.

6. The method of claim 5, wherein the content for the portion of the plurality of personalized messages comprises a link that, when clicked, causes a personalized web page to be displayed, and the publication server is configured to initiate the formation of the link.

7. The method of claim 6, wherein the clickthrough event comprises clicking the link that causes the personalized web page to be displayed.

8. The method of claim 1, wherein events caused by one or more actions taken by a first set of the plurality of intended recipients are in response to the first messages and events caused by one or more actions taken by a second set of the plurality of intended recipients are in response to the second messages.

9. The method of claim 1, wherein a plurality of messaging campaigns are executed at a given point in time and updated data for the plurality of executing messaging campaigns is continuously published from the database to the one or more cache instances.

10. A system for capturing events from recipients of messages delivered over multiple communication channels, the system comprising:
- a processor; and
- a memory storing instructions for execution by the processor, the instructions configuring the processor to:
- receive personalized messages for a plurality of intended recipients at a generic gateway, wherein the personalized messages are part of a messaging campaign being executed, content for at least a portion of the plurality of personalized messages is generated for specific intended recipients, and data about the specific intended recipients is stored in a database and, during execution of the messaging campaign, published to one or more cache instances such that the content for the portion of the plurality of personalized messages is generated by accessing the data about the specific intended recipients published to the cache instances;
- generate first messages of a first message type formatted according to a messaging protocol of a first communication partner and second messages of a second message type formatted according to a messaging protocol of a second communication partner;
- transmit the first messages to the first communication partner and the second messages to the second communication partner, wherein the first communication partner is configured to deliver the first messages over a first communication channel and the second communication partner is configured to deliver the second messages over a second communication channel; and
- capture events caused by one or more actions taken by a plurality of the intended recipients in response to one or more of the first messages and second messages, wherein the one or more actions taken comprise electronic interactions; and
- storing event data based on the captured events, wherein the event data is used to update the data about the specific intended recipients stored in the database, at least a portion of the updated data is published to the one or more cache instances during the execution of the messaging campaign, and content for additional personalized messages is generated using the updated data about the specific intended recipients.

11. The system of claim 10, wherein the first messages and the second messages are generated using content from the received personalized messages and comprise the intended recipients indicated by the received personalized messages.

12. The system of claim 11, wherein the one or more actions taken comprise at least one of replying to an email, navigating to a website, or completing a form.

13. The system of claim 11, wherein capturing events comprises listening, by a pubweb server, for an HTTP request from a clickthrough event.

14. The system of claim 13, wherein the content for the portion of the plurality of personalized messages comprises a link that, when clicked, causes a personalized web page to be displayed.

15. The system of claim 14, wherein the clickthrough event comprises clicking the link that causes the personalized web page to be displayed.

16. The system of claim 10, wherein events caused by one or more actions taken by a first set of the plurality of intended recipients are in response to the first messages and events caused by one or more actions taken by a second set of the plurality of intended recipients are in response to the second messages.

17. A non-transitory computer readable medium having instructions stored thereon that, when executed by a processor, cause the processor to capture events from recipients of messages delivered over multiple communication channels, wherein, when executed, the instructions cause the processor to:
- receive personalized messages for a plurality of intended recipients at a generic gateway, wherein the personalized messages are part of a messaging campaign, content for at least a portion of the plurality of personalized messages is generated for specific intended recipients, and data about the specific intended recipients is stored in a database and, during execution of the messaging campaign, published to one or more cache instances such that the content for the portion of the plurality of personalized messages is generated by accessing the data about the specific intended recipients published to the cache instances;
- generate first messages of a first message type formatted according to a messaging protocol of a first communication partner and second messages of a second message type formatted according to a messaging protocol of a second communication partner;
- transmit the first messages to the first communication partner and the second messages to the second communication partner, wherein the first communication partner is configured to deliver the first messages over a first communication channel and the second communication partner is configured to deliver the second messages over a second communication channel; and
- capture events caused by one or more actions taken by a plurality of the intended recipients in response to one or more of the first messages and second messages, wherein the one or more actions taken comprise electronic interactions; and
- storing event data based on the captured events, wherein the event data is used to update the data about the specific intended recipients stored in the database, at least a portion of the updated data is published to the one or more cache instances during the execution of the messaging campaign, and content for additional personalized messages is generated using the updated data about the specific intended recipients.

* * * * *

UNITED STATES PATENT AND TRADEMARK OFFICE
CERTIFICATE OF CORRECTION

| | | |
|---|---|---|
| PATENT NO. | : 11,005,673 B2 | Page 1 of 1 |
| APPLICATION NO. | : 16/369537 | |
| DATED | : May 11, 2021 | |
| INVENTOR(S) | : Tuatini et al. | |

It is certified that error appears in the above-identified patent and that said Letters Patent is hereby corrected as shown below:

In the Specification

In Column 1, Line 12, after "ENGINE"," delete "filed Jul. 18, 2014,".

In Column 4, Line 67, delete "execution" and insert -- execution. --, therefor.

In Column 15, Line 18, delete "url" and insert -- URL --, therefor.

In Column 17, Line 16, delete "If" and insert -- if --, therefor.

In Column 19, Line 67, delete "pulled in an" and insert -- pulled in in an --, therefor.

In Column 31, Line 15, delete "PTSN," and insert -- PSTN, --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*